(12) United States Patent
Ryall et al.

(10) Patent No.: US 7,076,132 B2
(45) Date of Patent: Jul. 11, 2006

(54) OPTICAL DEVICES AND METHODS

(75) Inventors: Richard James Ryall, Santa Rosa, CA (US); Michael A. Scobey, Santa Rosa, CA (US); Loren F. Stokes, Santa Rosa, CA (US)

(73) Assignee: Bookham (US) Inc., Abingdon (GB)

( * ) Notice: Subject to any disclaimer, the term of this patent is extended or adjusted under 35 U.S.C. 154(b) by 260 days.

(21) Appl. No.: 10/418,427

(22) Filed: Apr. 18, 2003

(65) Prior Publication Data

US 2004/0114865 A1     Jun. 17, 2004

Related U.S. Application Data

(60) Provisional application No. 60/373,711, filed on Apr. 18, 2002.

(51) Int. Cl.
*G02B 6/32* (2006.01)
*H04J 14/02* (2006.01)

(52) U.S. Cl. .................... 385/33; 385/31; 385/70; 385/72; 398/82; 398/85; 398/88

(58) Field of Classification Search .............. 385/24, 385/31, 33, 34, 38, 49, 37, 72, 73, 74, 77, 385/78; 398/82, 85, 88, 86
See application file for complete search history.

(56) References Cited

U.S. PATENT DOCUMENTS

| 3,902,784 | A | | 9/1975 | Dakss et al. ............... 385/31 X |
| 4,362,359 | A | | 12/1982 | Dammann et al. ......... 385/37 X |
| 4,474,424 | A | * | 10/1984 | Wagner ........................ 385/24 |
| 4,482,994 | A | * | 11/1984 | Ishikawa ...................... 398/86 |
| 4,592,619 | A | | 6/1986 | Weidel ..................... 385/33 X |
| 4,708,425 | A | * | 11/1987 | Gouali et al. .................. 398/88 |
| 5,436,716 | A | | 7/1995 | Stein ............................ 356/71 |
| 6,040,934 | A | | 3/2000 | Ogusu et al. ............... 359/152 |
| 6,168,319 | B1 | | 1/2001 | Francis ......................... 385/79 |
| 6,170,795 | B1 | | 1/2001 | Wayne ........................ 248/664 |
| 6,215,924 | B1 | * | 4/2001 | Hulse et al. .................. 385/34 |
| 6,320,996 | B1 | | 11/2001 | Scobey et al. ................ 385/18 |
| 6,594,415 | B1 | * | 7/2003 | Cappiello et al. ............. 385/24 |
| 2004/0114865 | A1 | * | 6/2004 | Ryall et al. .................... 385/39 |

FOREIGN PATENT DOCUMENTS

JP     57081227     5/1982     ............... 385/31 X

* cited by examiner

*Primary Examiner*—Brian M. Healy
(74) *Attorney, Agent, or Firm*—Banner & Witcoff, Ltd.

(57) ABSTRACT

A fiber optic device comprises an optical lens element having a focal length greater than 2 mm, and an optical signal source or receiver mounted at the focal plane of the optical lens element and operative to communicate optical signals with a selectively transparent interference filter through the optical lens element. Methods for the production and use of the fiber optic devices are also disclosed.

37 Claims, 15 Drawing Sheets

Fig. 1a
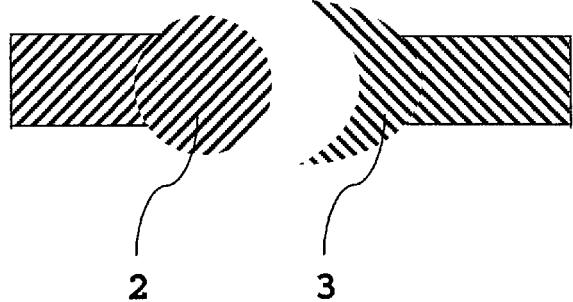
2   3
Fig. 1b
4
5
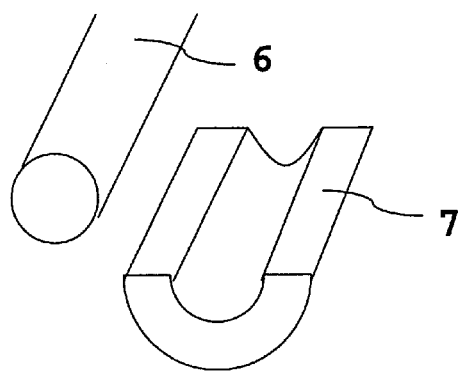
6
7
Fig. 1c
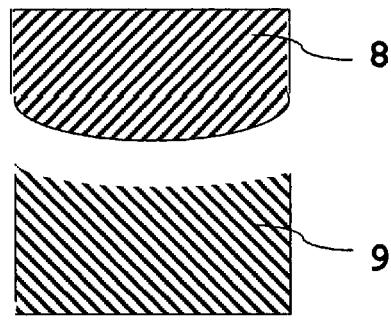
8
9
Fig. 1d

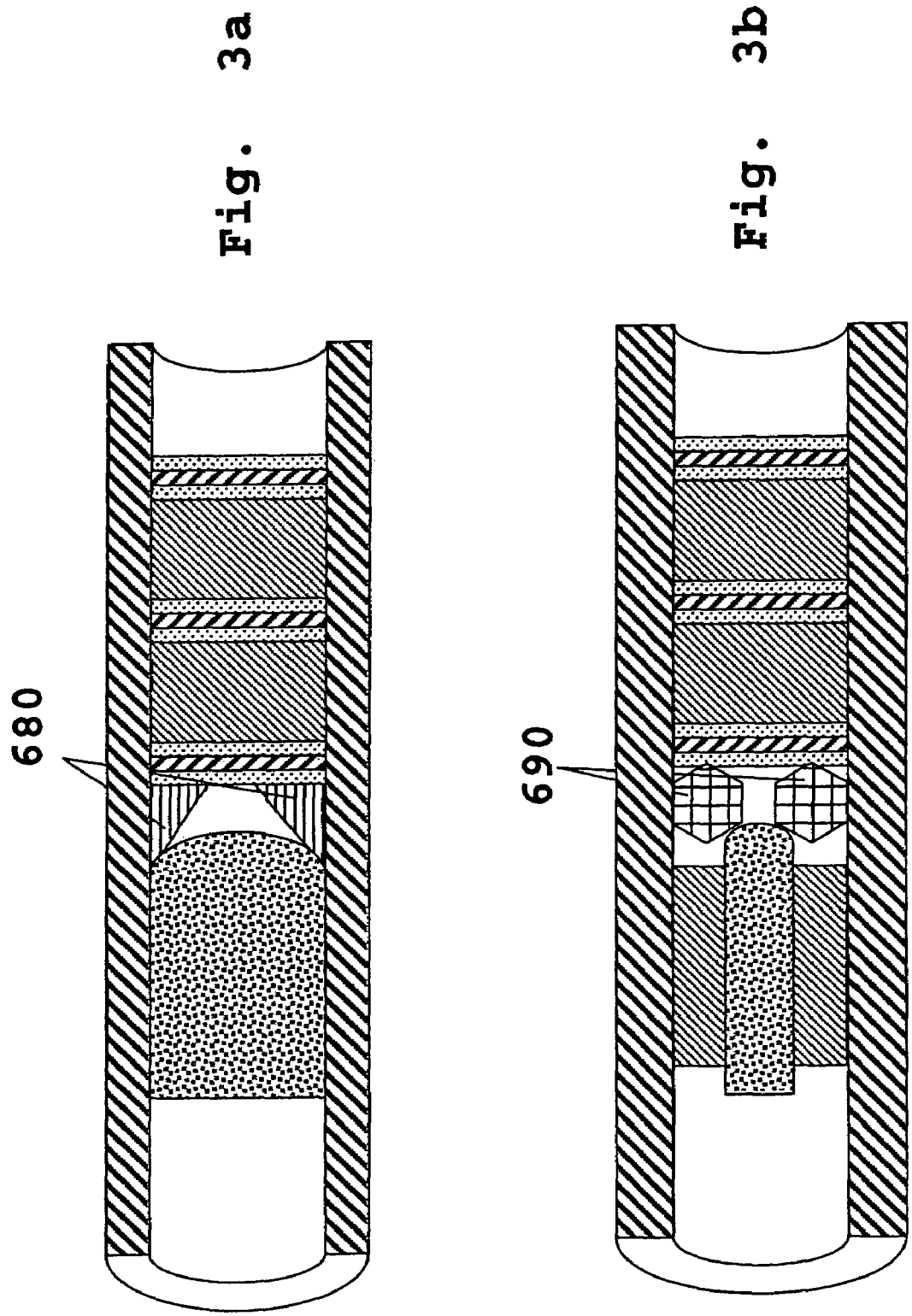

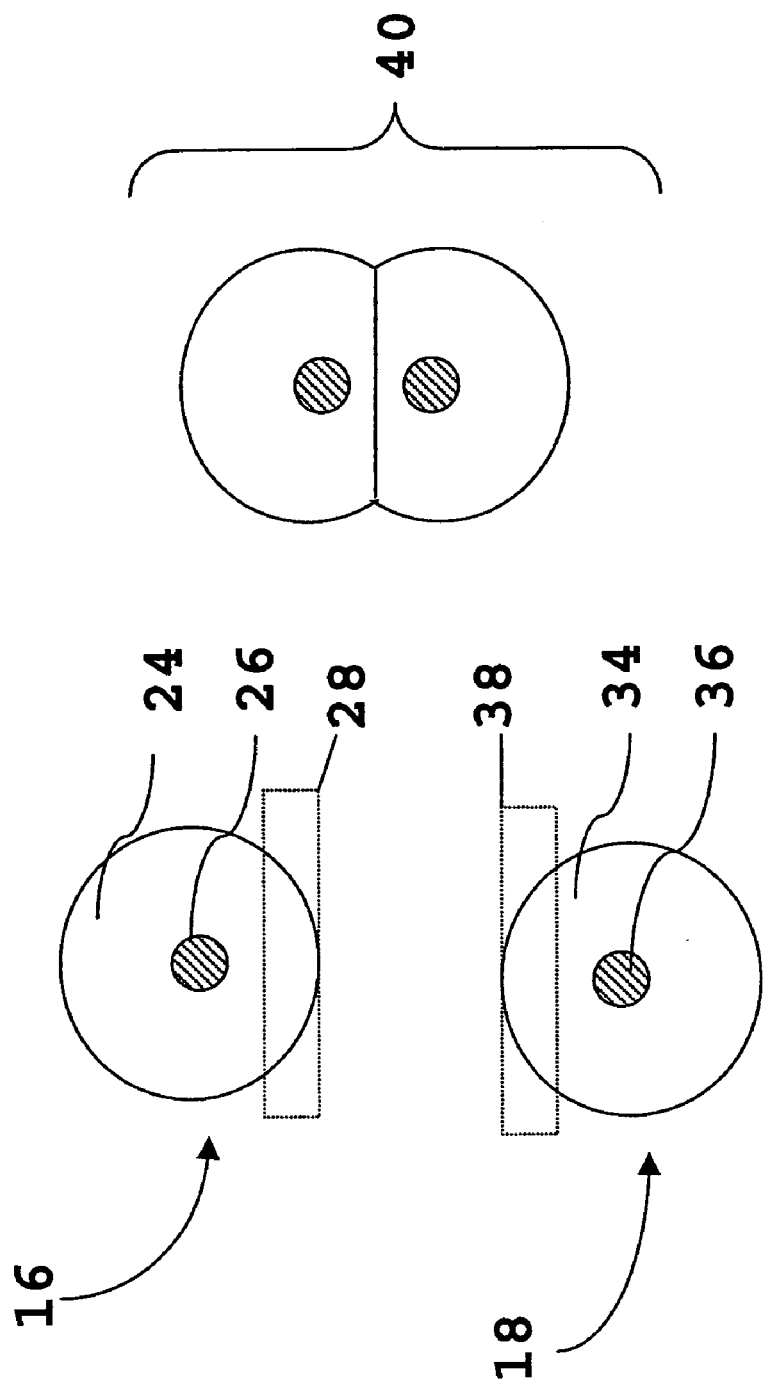

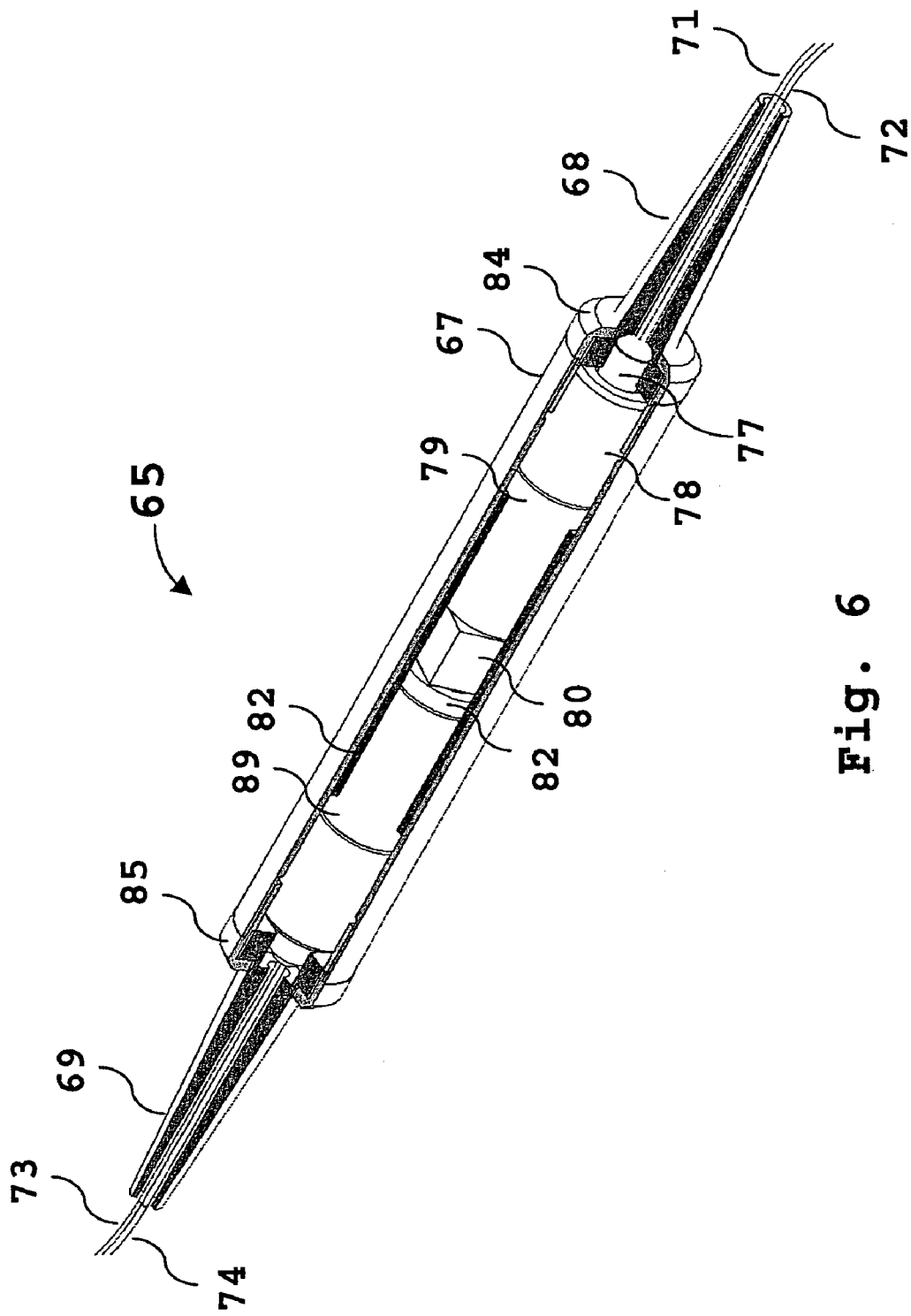

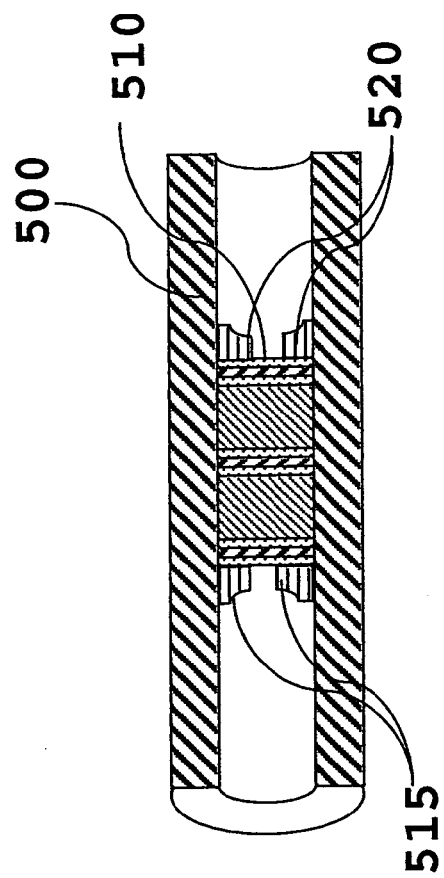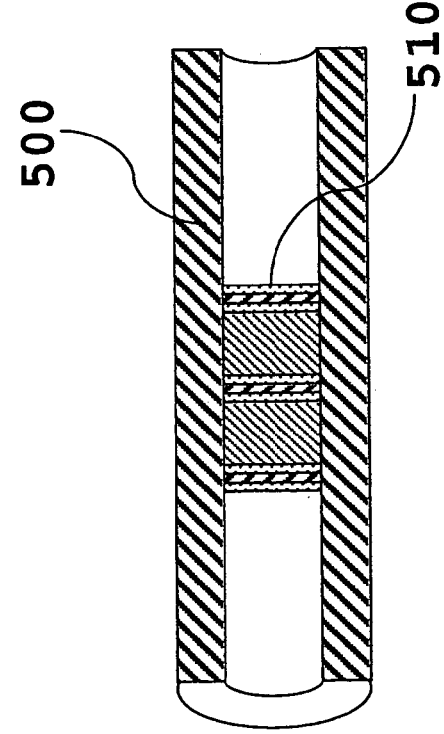
Fig. 13b
Fig. 13a

OPTICAL DEVICES AND METHODS

This application claims the benefit of U.S. Provisional Application No. 60/373,711, entitled OPTICAL DEVICES AND METHODS, which was filed on Apr. 18, 2002 by Richard J. Ryall et al.

CROSS-REFERENCED APPLICATIONS

This application is copending with commonly assigned U.S. patent application Ser. No. 10/096,478 filed on Mar. 12, 2002 and titled "Optically Coupled Etalons and Methods of Making and Using Same" and U.S. patent application Ser. No. 10/096,001 filed on Mar. 12, 2002 and titled "Optical Etalons and Methods of Making and Using Them," the entire disclosure of each of which is hereby incorporated herein by reference for all purposes.

FIELD OF INVENTION

The present invention relates to fiber optic devices and methods for assembling fiber optic devices.

BACKGROUND

Certain optical devices incorporate optical input and output fibers optically coupled within the device by one or more lenses and other optical elements, e.g., filters, that is, wavelength selective thin film filter elements, etc. The lenses are generally operative to collimate light emitted from an input or launch fiber along the optic axis, i.e., the optic axis of the lens (or to focus light passed into a receiving or output fiber). Examples of such devices include add/drop optical switches, interleavers and other multiplexing/demultiplexing devices (such devices being collectively referred to here in some instances as multiplexing devices or multiplexers), dispersion compensators, isolators, circulators, etc. Various lens types are known for use in such optical devices. GRIN lenses used in optical telecommunication systems, for example, are generally cylindrical in shape and about 1.8 mm in diameter and 4.8 mm long. Ball lenses for such devices are spherical and similarly sized.

The fiber optic industry employs lenses in such devices having a small focal length in order to reduce the size of the expanded (or collimated) beam. The standard lens employed by the fiber optic industry in such optical devices, especially in devices for telecommunication fiber optics, has a focal length of 2 mm or less. The short focal length lenses enable the use of small filter elements to receive the expanded beam (i.e., to reflect or pass all or a portion of the expanded beam). Such filters contribute substantial cost to such devices, and larger size filters would be substantially more costly and would be expected to result in substantially higher overall cost for the optical device.

The end of an optical fiber is positioned at the focal length of the lens. The signal beam launched out of the end of the fiber or received into it increases in size due to dispersion or divergence as it travels between the end of the launch fiber and the lens. The small focal length lenses used in optical devices result in correspondingly small distances between the fiber and the lens and, therefore, result in correspondingly low beam dispersion or divergence between the fiber and the lens. Advantageously, therefore, the expanded (or collimated) beam in the optical device has a small diameter. The small diameter expanded beam is passed between the lens and an associated filter, e.g., a selectively transparent interference filter or other components of the optical device.

In optical devices employing selectively transparent interference filters, e.g., for isolating or adding one or more wavelength bands or channels of a multi-channel optical signal, as much as possible of the optical signal emitted from the launch fiber of the optical device through the lens to the filter should be received by the face of the filter in order to have good optical performance properties, such as low loss, etc. The same optical consideration applies to expanded beam signals passed from a lens into a receiving fiber. Thus, as noted above, the short focal length lenses employed in such optical devices result in a small diameter expanded beam within the device and, so, enables the use of small, economical filter elements to receive all or substantially all of the expanded beam.

Improved optical devices are required by the fiber optic industry, especially for use in fiber optic telecommunication systems. Improved devices are required, for example, to fully meet the substantial interest in reducing the wavelength spacing between adjacent channels in multiplexed signal carried by fiber optic lines and processed by optical devices, such as multiplexers, dispersion compensators, isolators, circulators, etc., e.g., to 50 GHz spacing or even 25 GHz spacing, 12.5 GHz spacing or less.

SUMMARY

In accordance with a first aspect, an optical device comprises, in combination (i.e., in direct or indirect optical communication in the same optical device, e.g., together in the same housing or mounted by the same fixture, or the like), an optical lens element comprising a spherical or aspheric lens and having a focal length greater than 2 mm, preferably greater than 2.5 mm, more preferably at least 3 mm or greater than 3 mm, e.g., about 3.5–4.5 mm, even more preferably at least 4 mm focal length, and preferably not more than 8 mm. Such optical devices further comprise at least one optical signal element, such as an optical fiber, sensor, etc., having an optical surface operative to launch and/or receive optical signals passed by the lens, and one or more selectively transparent interference filters operative to communicate optical signals with the optical surface of the signal element through the optical lens element. In accordance with certain preferred embodiments of the optical devices disclosed here, the optical fiber or the operative surface of another optical signal element is positioned off-axis, at the focal plane of the optical lens element. As the term is used here, an optical signal element is any device or element operative to launch and/or receive an optical signal, e.g., a multiplexed optical signal in a fiber optic telecommunication system. Exemplary optical signal elements include waveguides, such as optical fibers mentioned above, active waveguides, etc, and light sources, such as lasers, semiconductor optical amplifiers (SOAs), edge emitting light emitting diodes (ELIDs). In certain preferred embodiments of the optical devises disclose here, the optical signal element is the free end of an optical fiber (i.e., the fiber's end surface from which optical signals are launched toward the lens or other element of the device or into which optical signals are received). As stated above, the operative surface of the fiber or other signal element is positioned a distance from the lens equal to the focal length of the lens, either precisely equal to the focal length (i.e., within the precision limits of the components and the assembly equipment) or slightly off the focal plane in order to achieve a desired optical effect. For example, the fiber may be positioned just inside the focal plane to achieve improved signal strength or shape. An optical signal element operative to send and/or receive optical signals in an embodiment of the devices disclosed here may in some cases, for convenience, be referred to here and in the claims as a signal receiver or as an optical signal launching device, or as a signal launcher or as an optical signal launching device, although it will be understood that optical fibers and other such optical signal elements frequently are operative to both launch and receive optical signals.

The one or more off-axis optical fibers and/or the operative surface of other optical signal element(s) in certain preferred embodiments are off-axis at least in the sense that they are offset from the optic axis cooperatively defined by the lens and the filter. That is, the center of the core of the fiber (or corresponding point of en operative surface of other optical signal element) is intentionally offset laterally relative to the optical axis, i.e., in a direction perpendicular to the optic axis, optionally referred to here as "radially" offset. The optic axis is defined or established by the lens and filter, typically and preferably being normal to the plane of the filter element, i.e., normal to the surface of the filter element that receives optical signals passed from the fiber or other signal source to the filter through the lens.

In certain preferred embodiments of the devices disclosed here, the ends of two or more optical fibers are bonded or potted side-by-side in a ferrule, e.g., a glass or ceramic capillary, to form a fiber pigtail. For example, three or four or more fibers can be commonly mounted in this way in a ferrule. The fiber ends sit side by side in the ferrule, optionally being in contact with each other or laterally spaced from each other (i.e., radially spaced relative to the longitudinal axis of the fiber), e.g., up to 100 microns, more preferably up to 10 microns in order to achieve good device packaging and performance. The two or more fiber ends of the ferrule, being individually or collectively an optical signal element in the device, face the collimating lens and sit at (e.g., just inside) the focal plane of the collimating lens. That is, in such dual fiber ferrules neither of the two fiber ends sits exactly on the optic axis of the collimating lens; rather, the point or line of contact between them is positioned as nearly as practicable on the optic axis. In typical embodiments of the devices disclosed here employing one or more dual fiber ferrules, the core-to-core separation between two fibers of the ferrule may be, for example, about 125 um or less, such as 100 um. The two cores straddle the optic axis of the collimating lens, the center of each core being approximately (within manufacturing tolerances) 62.5 um from the optic axis in the case of 125 um core-to-core spacing. The angle of incidence (AOI) is therefore:

$$AOI = arc\tan(62.5\ um/f)$$

where f is the lens focal length in millimeters. As disclosed above, the lenses employed in the optical devises disclosed here have a focal length greater than 2 mm. Thus, the AOI of such devices can be calculated to be less than 1.8 degrees:

$$AOI = arc\tan[0.0625\ um/(f>2\ mm)] < 1.8\ \text{degrees}.$$

In certain preferred embodiments, the angle of incidence (AOI) of an expanded beam signal between the off-axis optical fiber and the lens is not greater than 1.5 degrees, more preferably not greater than 1.2 degrees, most preferably not greater than 1 degree, e.g., about 0.9 degree. Such advantageously low angles of incidence are achieved in the devices disclosed here in major part by the longer focal length optical lenses. In certain preferred embodiments wherein the ends of two or more optical fibers of the device are set in a dual fiber ferrule, e.g., a glass or ceramic pigtail, wherein the fiber ends sit side by side in the ferrule in contact with each other, the angle of incidence is advantageously further reduced by removing at least a portion of the outer cladding or jacket of the fibers where they touch each other in the ferrule, to bring the fiber centers closer together. The cladding can be removed, for example, by polishing, etching or other suitable method. The AOI also can be further reduced by using fiber with smaller cladding diameter such as 80 um diameter. This brings the centers of the fiber cores closer together and, therefore, nearer to the optic axis of the lens, thereby further reducing the AOI. For example, the portion of cladding 24 in imaginary box 28 of optical fiber 16 shown in FIGS. 4a and 4b may be trimmed, cut, or otherwise removed. Similarly, the portion of cladding 34 in imaginary box 38 of second optical fiber 18 shown in FIGS. 4a and 4b may be removed. The fibers may then be physically coupled such that the launching ports, fiber cores 26 and 36 of the first optical fiber 16 and second optical fiber 18, respectively, are positioned closer in space. Specifically, the necessary portions of the fiber jackets are removed and the two fibers are inserted into a ferrule with their claddings touching each other.

The one or more selectively transparent interference filters of the optical devices disclosed here are operative to communicate optical signals with the off-axis optical fiber through the lens. It should be noted that the terms "selectively transparent interference filter" and "filter" or "optical filter" or other such terms are used interchangeably here and in the claims unless otherwise stated or clear from context. Such interference filters preferably comprise layers or films of alternating materials, specifically, one or more layers of a first suitable material having higher refractive index alternating with one or more layers of a second suitable material having lower refractive index. The relative terms "higher" and "lower" are defined by each other, that is, the higher refractive index of the first material need only be sufficiently higher than the lower refractive index of the second material, and visa-versa, to achieve good and efficient optical wavelength selectivity adequate for the intended use, at layer thickness practical for sputter deposition or other suitable deposition or filter production method. Magnetron sputtering and other thin film deposition techniques are well known to those skilled in the art for production of such interference filters.

Significant advantage is achieved by the optical devises disclosed here, especially by such devices operative at smaller bandwidth spacings, preferably having a spectral response suitable for channel spacing of 50 GHz or less, e.g., 25 GHz channel spacing, 12.5 GHz channel spacing or even smaller. Most preferably the channels are on the ITU grid in view of the suitability of such channel positioning in the telecommunications field. Exemplary devices comprise, in addition to the off-axis fiber and optical lens stated above, one or more selectively transparent, preferably high Q, interference filters having a spectral response suitable for 50 GHz or less channel spacing, preferably being selectively transparent to one or more channels centered on (i.e., having a center wavelength on) the ITU Grid, or 25 GHz spacing on the ITU Grid, or even 12.5 GHz, again preferably centered on the ITU grid. Especially preferred embodiments employ larger thin film filters, i.e., sized to receive substantially all of an optical signal passed by the off-axis fiber through the associated long focal length lens, such filters preferably having at least three, more preferably five or more coherently coupled cavities. Other especially preferred embodiments employ as the off-axis launch or receive fiber, optical fiber operative as a single mode fiber for 1550 nm optical signals. Such devices are found to achieve excellent optical performance properties as multiplexers, e.g., as three-port add/drop multiplexers. It should be understood that an interference filter is a "high Q" filter, as that term is used here and in the appended claims, when it has a Q value, for narrow band filters, greater than 2000, more preferably greater than 3000. A filter's value Q is defined as the center wavelength of a channel selectively passed by the filter (e.g., at 1550 nm) divided by the bandwidth at 3 dB. There are, however, certain filters suitable for use in the devices and systems disclosed here, having extremely steep slopes, for which a lower number qualifies as a high Q value. For example, for a filter that passes four to eight 100 GHz spaced channels on the ITU grid (i.e., having a spectral response suitable to pass four to eight channels each having a center wavelength on the ITU grid spaced 100 GHz from the next adjacent channels) and reflects all other ITU grid channels, a Q value of about 500 represents a high Q value for such filters. Typically, such embodiments having extremely steep slopes benefit from the attributes of the optical devices disclosed here.

In accordance with another aspect, an optical device or system comprises a housing, a first optical lens element positioned in the housing, an optical signal element positioned in the housing or at least having an optical surface in the housing at the focal plane of the lens element, the first optical lens element preferably is directly optically coupled with the optical signal device and has a focal length greater than 2 mm, a wavelength selective optical element in the housing and directly optically coupled with the first optical lens element, a second optical lens element mounted in the housing and directly optically coupled with the wavelength selective optical element, having a focal length greater than 2 mm, and an optical signal receiving element directly optically coupled with the second optical lens element, for receiving signals passed by the optical element. As used here and in the claims, a signal launching component or element refers to an optical component or subassembly that is operative to communicate optical signals (i.e., launch and/or receive optical signals) with an optical lens element. In accordance with certain preferred embodiments, the optical signal launching component is a laser signal generator, a collimator, an optical fiber, a fiber pigtail or other such device. It should be understood that a fiber or ferrule or other device may be referred to as being mounted in the housing of an optical device disclosed here if at least a portion of it is within the housing. Those skilled in the art will understand, for example, that one end of a fiber may be set in a ferrule, with the rest of the fiber extending out of the housing to make optical connection to another fiber or other optical device.

In accordance with an additional aspect, a fiber optic device comprises, in combination, an optical lens element comprising a lens defining an optic axis and having a focal length greater than 2 mm, preferably 2.5 mm to 8 mm, and a second optical element operative to communicate optical signals with the optical lens element, wherein the optical lens element has an engagement surface and the second optical element has a corresponding surface configured to lockingly engage the engagement surface of the optical lens element. In certain preferred embodiments, the second optical element is an optical signal launching element, e.g., an optical fiber ferrule, or a component comprising a selectively transparent thin film filter element. The engagement surface of the lens element and the corresponding surface of the second element lockingly engage each other such that, once put properly together, they will retain their connection against forces typically encountered in assembly operations. Optionally, the two components are also fixed by potting or other bonding technique or the like, e.g., by epoxy or other adhesive in a housing in which the components are mounted. In certain preferred embodiments, the corresponding surface of the second optical element is configured to lockingly engage the engagement surface of the optical lens element in only a single correct way, most preferably in proper optical alignment with each other. That is, the two components have a self alignment feature such that they can only lockingly engage each other in one orientation and position relative to each other, in which single orientation and position the two components are automatically or unavoidably in proper optical alignment. This feature of certain preferred embodiments advantageously facilitates rapid and proper assembly of the optical device.

In accordance with a method aspect, an optical device is produced by steps comprising lockingly engaging an optical lens element with a second optical element. The lens element comprises a lens having a focal length preferably greater than 2 mm and an engagement surface. A second optical element, is operative to communicate optical signals with the optical lens element, has a corresponding surface configured to lockingly engage the engagement surface of the optical lens element.

The optical devices disclosed above, and systems comprising such devices, and the methods disclosed for their production will be recognized by those skilled in the art to represent a significant technological advance. Robust optical devices can be produced meeting precise optical performance characteristics, with advantageously low production costs and good production flexibility. In preferred embodiments, optical devices in accordance with the present disclosure have the advantageous attributes of small size, simple, rapid and potentially inexpensive construction, and good optical performance, including low loss, low polarization dependent loss and polarization mode dispersion, and low chromatic dispersion. Additional features and advantages will be understood from the following detailed description of certain preferred embodiments.

BRIEF DESCRIPTION OF FIGURES

Certain preferred embodiments of the invention will be described below with reference to the attached drawings in which:

FIGS. 1a–1d each is a schematic section view of a pair of optical components of an optical device in accordance with certain preferred embodiments, having engagement and corresponding surfaces for lockingly engaging each other in assembly of the optical device;

FIGS. 3a and 3b each is a schematic section view of a preferred embodiment comprising optical elements having lockingly engaged surfaces.

FIGS. 4a and 4b each is a schematic section view of a pair of optical fibers suitable for certain preferred embodiments;

FIG. 6 is a schematic view of an optical device in accordance with certain preferred embodiments;

FIGS. 13a and 13b each is a schematic section view of a lens seat element in physical contact with an optical element in the housing of an optical device, in accordance with certain preferred embodiments;

FIG. 14 is a schematic section view of another preferred embodiment of an optical device, wherein the optical elements comprise mating surfaces for alignment of the optical elements; and It will be apparent that the optical components of the fiber optic device shown in the figures are not necessarily to scale. Certain dimensions, such as the widths and lengths of the collimator and optical elements, may have been enlarged relative to other dimensions, such as the size of the housing, for clarity of illustration and ease of understanding. It will be understood by those skilled in the art, that the fiber optic devices disclosed here can be used generally in any orientation relative to gravity and/or other components to which they might be optically and/or physically coupled, e.g., by optical fiber or the like.

DETAILED DESCRIPTION OF CERTAIN PREFERRED EMBODIMENTS

Figure 2:
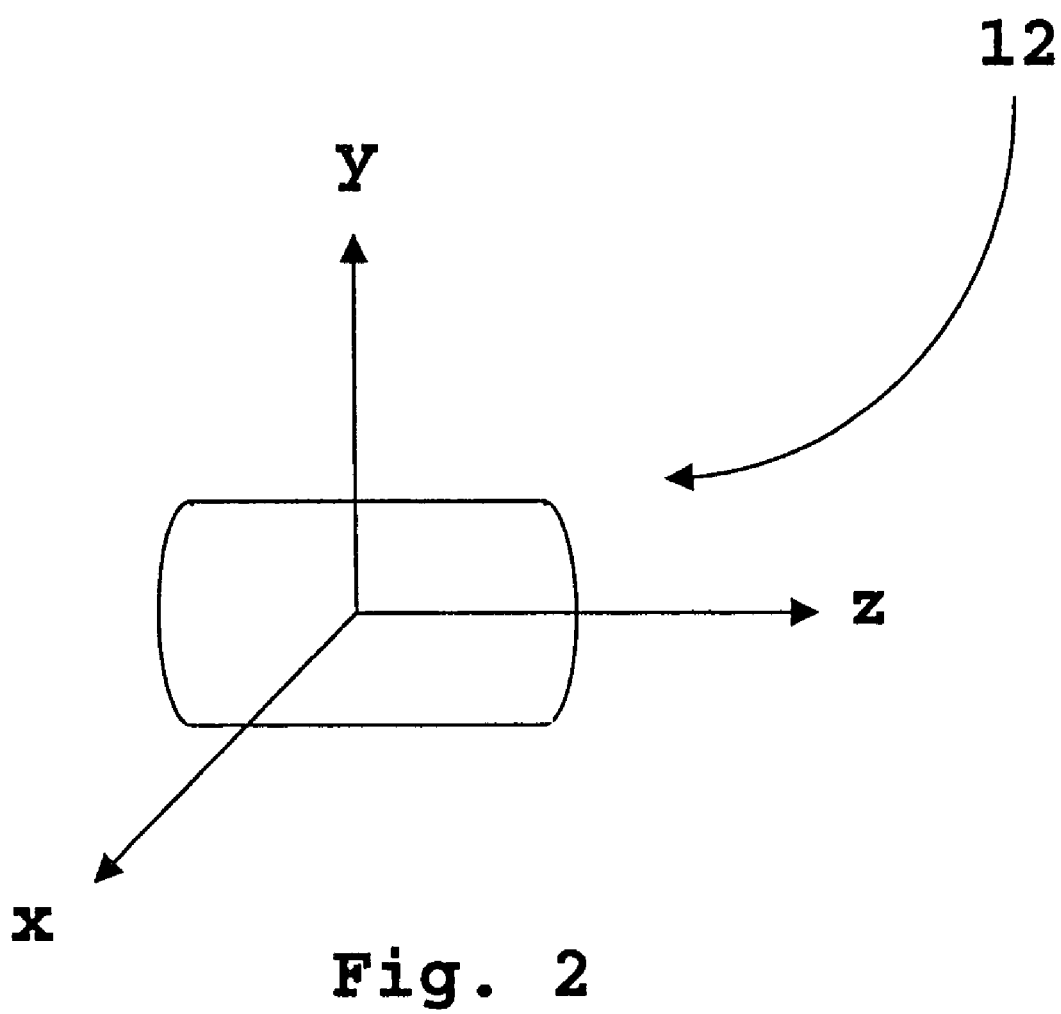
FIG. 2 is a schematic section view of an optical lens element suitable for certain preferred embodiments, showing the optic axis of the lens.

Based on the foregoing disclosure, it will be recognized by those skilled in the art that the novel optical devices disclosed here can be formed in any of innumerable different configurations and sizes. The precise size and configuration of any particular optical device, including the choice of materials and the like, will depend in large part on the intended use and on the expected use environment of that particular device, as well as on the desired optical properties and performance characteristics. For convenience in this more detailed description of certain preferred embodiments, the devices will generally be of a type suitable for use in fiber-optic telecommunication systems, such as optical add/drop multiplexers and may be referred to as fiber optic devices. It will be within the ability of those skilled in the art, given the benefit of this disclosure, to select suitable materials and designs, as well as manufacturing techniques, for production of these and other optical devices in accordance with the principles of the present invention, suitable for these and other types of applications.

All numerical values used in this disclosure and in the appended claims should be understood to mean a value precisely equal to or approximately equal to the number recited, unless otherwise said to be otherwise. A value is approximately equal to a recite number if it is accomplishes the same primary effect, or is within typical manufacturing tolerances of the recited number, or is intentionally offset from the recited number by an amount intended to accomplish a secondary effect without substantially sacrificing the primary effect, etc. Thus, for example, fibers in a dual fiber ferrule are "10 microns" apart if they are 9–11 microns apart, such as 10.5 microns apart.

As used here and in the claims, an optical fiber may be referred to in some cases as being "mounted off-axis," or may be referred to as an "off-axis fiber" if it is incorporated in an optical device with an associated optical lens and is laterally offset from the optic axis, typically the optic axis defined by the lens and an associated filter. That is, the longitudinal axis of an off-axis fiber, at the center of the fiber core, at the end of the fiber (i.e., the fiber end which receives and/or launches an expanded beam optical signal to or from the associated lens), is slightly laterally offset from the optic axis.

As used here and in the claims, an optical fiber of an optical device, such as an add/drop multiplexer, may be referred to in some cases as being "mounted at the focal plane of the lens," meaning that the end of the optical fiber is mounted at the focal plane of the lens, i.e., the end of the fiber (the fiber end optionally being potted in a ferrule or the like) is positioned on the optic axis, or slightly off the optic axis in the case of an off-axis optical fiber as just described, at a distance from the lens equal or nearly equal to the focal length of the lens. The end of the optical fiber may be positioned slightly closer to the lens or farther away, e.g. due to manufacturing tolerances, rather than precisely at the focal plane, and the term "mounted at the focal plane of the lens," as that term is used here and in the claims, also includes such positioning.

Components of an optical device are directly optically coupled, as that term is used here, when they are in optical communication, i.e., are positioned and oriented so as to be operative to pass an optical signal from one to the other, and are in optical contact or otherwise in physical contact with each other and/or are mounted to each other, e.g. by bonding material in or out of the optical path, or are positioned, e.g., mounted, in the same housing or by the same fixture.

As used here and in the claims, the term "optical lens element" and variations of that term refer to any lens or a subassembly comprising one or more lenses with other components, e.g., GRIN lenses, drum lenses, ball lenses, etc. As used here and in the claims the term "optical filter element" and variations of that term refer to wavelength selective optical devices, e.g., Fabry-Perot etalons, stacked and optically coupled etalons, DWDM band pass filters, interleavers, and the like. As used here and in the claims, the terms "focus" and "collimate" and related word forms are generally used interchangeably, unless indicated otherwise by context.

In accordance with certain especially preferred embodiments of the optical devices disclosure here, a dual fiber ferrule mounts two off-axis optical fibers at the focal plane of an optical lens defining an optic axis and having a focal length greater than 2 mm, the fibers being operative to communicate optical signals with the optical lens, and a selectively transparent interference filter operative to communicate optical signals with the off-axis optical fiber through the lens and having an optical pass band corresponding to not more than 50 GHz spacing or even 25 GHz spacing, 12.5 GHz spacing or less, most preferably being centered on the ITU Grid. Those skilled in the art will recognize that the ITU Grid is an accepted set of wavelengths and wavelength spacings for optical telecommunication systems, established by the International Telecommunication Union. As disclosed above, the optical devices disclose here have an AOI of less than 1.8 degrees, preferably not greater than 1.5 degrees, more preferably not greater than 1.2 degrees, most preferably not greater than 1.0 degree. Certain such embodiments of the optical devices disclosed here use a lens with focal length of about 4 mm, giving an angle of incidence (AOI) of about 0.9 degree. Substantial improvement in optical packaging and performance can be realized through the use of such long focal length lenses. The spot size radius of the collimated beam, W, is determined by the collimating lens focal length f and the fiber divergence half angle A in accordance with the following formula:

$$W=(f) \times \tan(A).$$

The fiber divergence half angle is given by:

$$A = arc\ sin(NA)$$

where NA is the Numerical Aperture of the fiber. Typical NA values are about 0.10, giving a fiber divergence half angle of A=6 degrees, and, therefore, spot size radius W=250 um for a 2.5 mm focal length. The corresponding spot diameter is twice the radius, that is, 2 times W, or 500 um. The collimated beam divergence half angle $\Theta$ (theta) for any given wavelength is given by:

$$\Theta = Lambda/(Pi*W)$$

where Lambda is the wavelength. For Lambda of 1.55 um, NA of 0.10, focal length of 2.5 mm and spot size radius of 250 um, the collimated beam divergence half angle is $$\Theta = 1.55\ um/(Pi*250\ um)$$
$$= 2.0\ mrad$$
$$= 0.11\ degree.$$

For a collimating lens focal length of 4 mm, W=400 urn (spot diameter is 800 mm), and the collimated beam divergence half angle $\Theta$ is 0.07 degree. Certain preferred embodiments of the optical devices disclosed here have a collimated beam spot diameter greater than 500 um and collimated beam divergence half angle less than 0.11 degree, these being optically equivalent. The long focal length collimator lenses of the optical devices disclosed here results, therefore, in a larger spot size diameter than in otherwise corresponding device design employing the traditional short focal length collimator lenses. Accordingly, preferred embodiments employ correspondingly larger filter elements, preferably round filters for ease of packaging and improved optical performance, e.g., filters having a signal-receiving face with a diameter of 2 mm to 3 mm, e.g., about 2.3 mm. For example, in certain preferred embodiments of the devices disclosed here, comprising filters having an optical pass band of 50 GHz spacing or 25 GHz spacing or 12.5 GHz spacing or less, i.e., having a spectral response suitable for such channel spacing, larger filters are found to be useful or necessary to meeting performance requirements typical for such devices in the optical telecommunication field.

Accordingly, the long focal length lenses provide substantial advantage in the devices disclosed here and in some embodiments make good use of larger filter chips necessitated by other design considerations. The following table shows exemplary values for optical devices in accordance with this disclosure, in comparison to corresponding values for prior devices employing 2.0 mm lenses.

| f (mm) | AOI (deg) | 2W (um) | $\Theta$ (deg) |
| --- | --- | --- | --- |
| 2.0 | 1.79 | 400 | 0.141 |
| 2.5 | 1.43 | 500 | 0.113 |
| 3.0 | 1.19 | 600 | 0.094 |
| 3.5 | 1.02 | 700 | 0.081 |
| 4.0 | 0.90 | 800 | 0.071 |
| 4.5 | 0.80 | 900 | 0.063 |

Discussion relevant to the above can be found in the textbook: "Lasers," Anthony E. Siegman, University Sciences Books, Sausalito, Calif., 1986, the entirety of which is hereby incorporated herein for all purposes, especially, for example, pages 663–680.

Figure 5B:
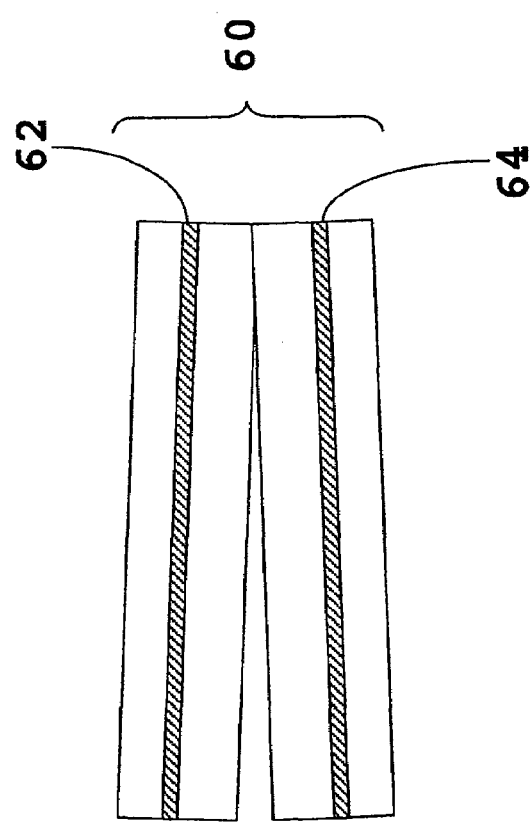
FIGS. 5A and 5B are schematic illustrations of fiber ends suitable for use in certain preferred embodiments.
Figure 5A:
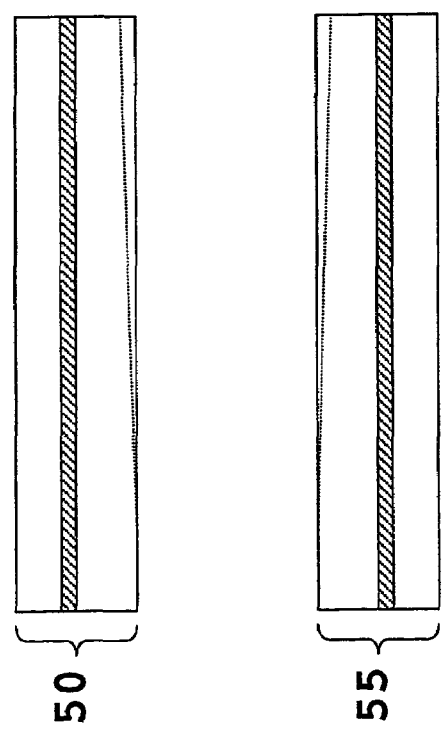

The free end of two optical fibers suitable for optical devices in accordance with the present disclosure, are illustrated schematically in FIGS. 5A and 5B. In FIG. 5A, fiber 50 and fiber 55 are shown with phantom lines to indicate portions of the fiber cladding to be removed. In FIG. 5B the fibers are in contact with each other, suitably positioned for mounting in a dual fiber ferrule. As noted above, larger filter elements may be required as a result of the longer focal length and consequently larger spot-diameter of the expanded beam passed by a lens element of a low angle optical device in accordance with the present disclosure. However, it is found in preferred embodiments of the optical devices disclosed here, that the larger filter elements cooperate with the long focal length lens and other components of the devices to provide advantageous optical performance characteristics, especially in filters, interleavers and other optical devices operative at, i.e., having a spectral response suitable for, channel spacing of 50 GHz, 25 GHz, 12.5 GHz or smaller.

FIG. 6 illustrates an exemplary fiber optic device in accordance with certain preferred embodiments. Device 65 comprises housing 67, shown partially broken away, with flexible conical ends 68, 69 extending from end caps 84, 85, respectively, to provide seals and strain relief pathways for the optical fibers or leads 71–75 of the device. Fibers 71, 72 extend into ferrule 76 positioned of ferrule 77. In general, the two axial ends of the device mirror one another, and only one side will be described in detail here. Thus, for example, corresponding structure is seen for the ferrule at the opposite end for fibers 73, 74. Ferrule 77 is positioned in ferrule sleeve 78 that provides a mating surface to receive a first lens element, specifically, drum lens 79. Ferrule 77 almost contacts drum lens 79. Filter 80 is approximately axially centered in a sleeve, i.e., center piece 82 that typically is assembled into the housing first. Filter 80 is laterally centered on, and bonded to spacer ring 82. As noted above, the required performance characteristics of the optical device will determine, in part, its design and the selection of its components. Typical product requirements for 50 GHz filter devices, 25 GHz filter devices, 12.5 GHz filter devices and the like are well known to those skilled in the art and generally will be set by system designers. The optical signal transmission properties for a device in accordance with the design of FIG. 6, for example, wherein the optical lenses 79, 89 each has a focal length of only 1.8 mm would not meet certain stringent product requirements, whereas the optical signal transmission properties for such device wherein such optical lenses each has a focal length of 2.0 mm or greater does meet such requirements.

Figure 7A:
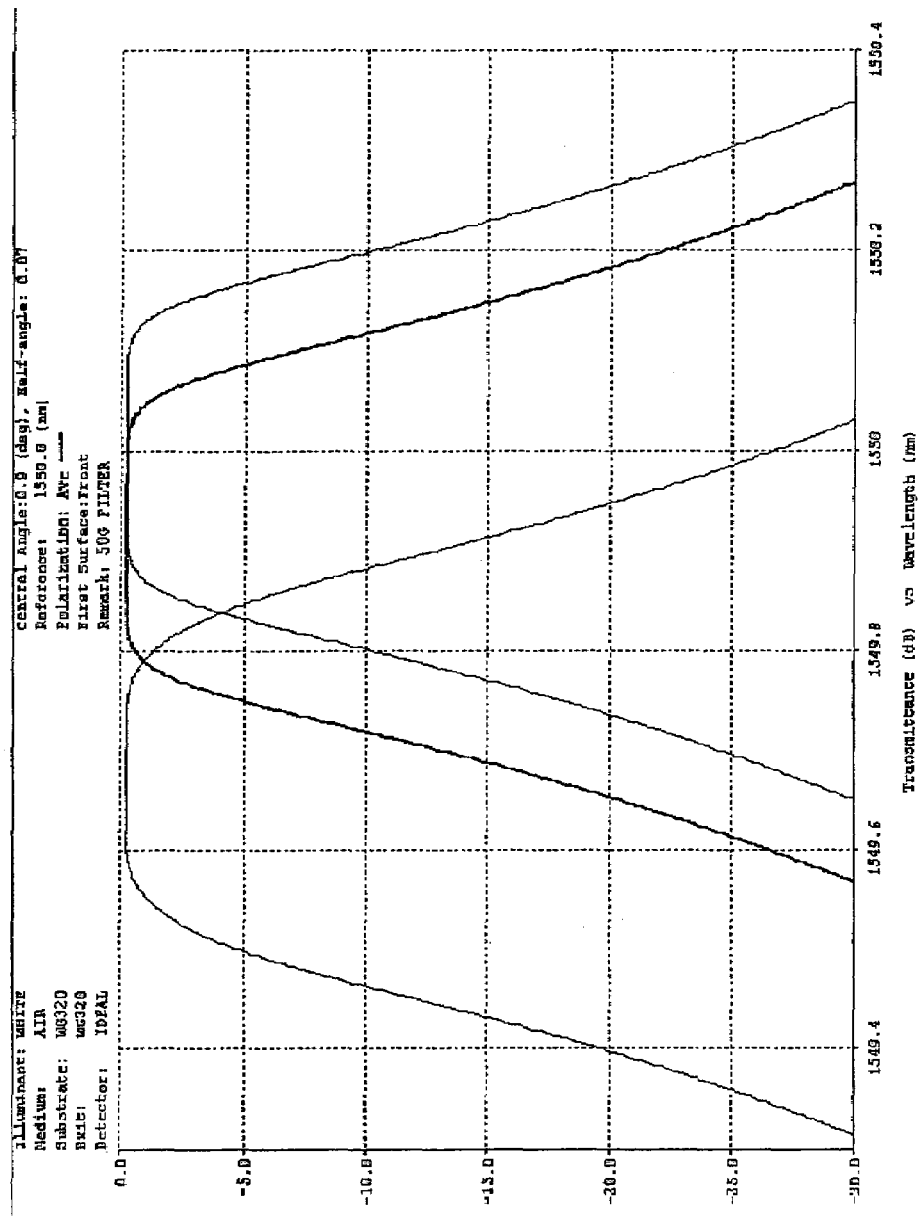
FIGS. 7a is a graphical representation of the pass band shape of an optical device operative as a 50 GHz filter (i.e., a filter having a spectral response suitable for 50 GHz channel spacing), comparing the ideal pass band shape with that achieved using a 4.0 mm focal length lens and with the less desirable pass band shape achieved using a short focal length lens (2.0 mm)
Figure 7B:
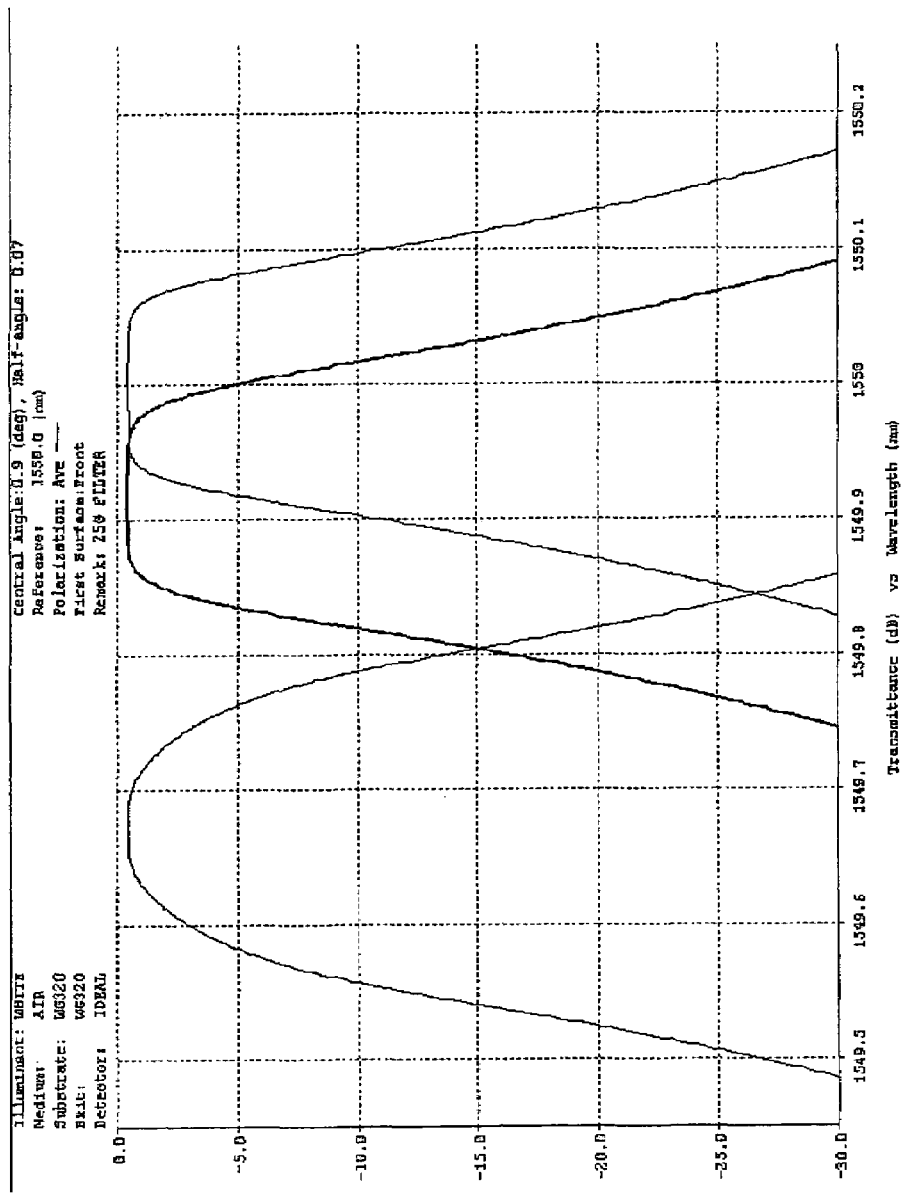
FIGS. 7b is a graphical representation of the pass band shape of an optical device operative as a 25 GHz filter, comparing the ideal pass band shape with that achieved using a 4.0 mm focal length lens and with the less desirable pass band shape achieved using a short focal length lens (2.0 mm)

FIGS. 7A and 7B show various ideal and actual pass band shapes for optical filter devices in accordance with the embodiment of FIG. 6. More specifically, FIG. 7A shows pass band shapes for a 50 GHz filter devices. The right-most trace in FIG. 7A shows an ideal pass band shape for a 50 GHz filter device centered at 1550 nm, i.e., a thin film interference filter at zero degree angle of incidence, not in a package. It has a 0.5 dB bandwidth of 0.26 nm. The left-most trace in FIG. 7A is that of a standard package using 2.0 mm focal length lens and 1.8 degree angle of incidence. It has a 0.5 dB bandwidth of only 0.20 nm. Such device would have a 0.14 degree collimated beam divergence angle. In contrast, the center trace in FIG. 7A exemplifies the improved packaging technology disclosed here, using 4.0 mm focal length lens and 0.9 degree angle of incidence. It has a 0.5 dB bandwidth of 0.25 nm. Thus, it can be seen that an improved pass band shape is achieved by the same optical device using a 4 mm focal length lens, resulting in an angle of incidence of only 0.9 degree and a collimated beam divergence angle of only 0.07 degrees. It can be seen that the pass band achieved by the long focal length lens device represented by the center trace is substantially superior to the pass band achieved by the same device using a 2 mm focal length lens. Specifically, the pass band of the device employing 4 mm focal length lenses is seen to have less rounding at the top, a wider pass band and narrower rejection band.

Similarly, FIG. 7B shows pass bands for a 25 GHz filter device in accordance with the embodiment of FIG. 5A and FIG. 6. The right-most trace in FIG. 7B shows an ideal pass band shape for a 25 GHz filter device centered at 1550 nm, i.e., a thin film interference filter at zero degree angle of incidence, not in a package. It shows a 0.5 dB bandwidth of 0.14 nm. The left-most trace is that of a standard optical device package using 2 mm focal length lens and 1.8 degree angle of incidence. It has a 0.5 dB bandwidth of only 0.08 nm. The center trace in FIG. 7B shows the pass band achieved using an improved package as disclosed here, with a 4.0 mm focal length lens and 0.9 degree angle of incidence. It has a 0.5 dB bandwidth of only 0.125 nm. Here, again, as in FIG. 7A, the pass band achieved by the improved filter device employing 4 mm focal length lenses is seen to be substantially superior to the pass band achieved in the same device using 2 mm focal length lenses. There is less rounding in the long focal length device, a wider pass band and narrower rejection band. The pass band degradation in the 2 mm focal length device is even more evidence in the 25 GHz embodiment of FIG. 7B than in the 50 GHz embodiment of FIG. 7A. As pass band spacing further decreases below 25 GHz, the advantage provided by the long focal length devices disclosed here is correspondingly greater.

Certain preferred embodiments of optical devices in accordance with the present disclosure comprise a housing, an optical lens mounted in the housing, defining an optic axis, an off-axis optical fiber mounted at the focal plane of the optical lens and operative to communicate optical signals with the optical lens, and a high Q, selectively transparent interference filter having a 50 GHz optical pass band on the ITU Grid (i.e., having a spectral response suitable for 50 GHz channel spacing, typically using considerably less than the entire 50 GHz wavelength range for pass band and, rather, using a narrower pass band within the 50 GHz range designated for that channel) and operative to communicate optical signals with the off-axis optical fiber through the lens, wherein the optical lens has a focal length of at least 3 mm, e.g., 3.5 to 4.5 mm, the angle of incidence of an optical signal passed between the off-axis optical fiber and the lens is not greater than 1 degree, and the optical fiber is operative as a single mode fiber for 1550 nm optical signals. Suitable long focal length lenses are commercially available and may advantageously be less costly than corresponding short focal length lenses currently used, due in part to the large supply and ease of manufacturing of the long focal length lenses. Preferably the optical lens element having a focal length greater than 2 mm is a GRIN lens or the generally less expensive ball lens or drum lens. The optical lens element may be ground to a size suitable for packaging into the fiber optic device. Those skilled in the art will understand that high Q filters suitable for use in the devices disclosed here are commercially available and well understood, for example, in light of reference works such as *Thin-Film Optical Filters*, $3^{rd}$ Edition, by H. A. Macleod, Institute of Physics Publishing, Bristol, UK, the entire disclosure of which is hereby incorporated by reference herein for all purposes.

Optionally, the fiber optic devices disclosed here include a receiving component. As used here and in the claims, a receiving component can be any component operative to receive optical signals passed by the lens, e.g., for detection, decoding or transmitting the passed signals. Exemplary receiving components include collimators, optical fibers, fiber pigtails, and the like, e.g., any of fibers 71–74 of FIG. 6. In a typical optical device in accordance with this disclosure, optical signals from the launching component are incident on the first optical lens element, which focuses or collimates the signals onto the surface, or a port, of a thin film filter operative to selectively pass certain signals, e.g., certain wavelength pass bands, and to reflect other signals. Signals that are passed are then incident on the surface of a second optical lens element, which focuses the signals onto the port of a receiving component. The receiving component can be (or can be directly or indirectly connected to) a detector, a decoder, an optical add/drop multiplexer, an optical fiber, or the like.

The housing may be any suitable mounting or enclosure device integrating the optical elements stated just above and optionally additional elements of the device. Exemplary embodiments of the optical devices disclosed here are advantageously packaged in a substantially tubular housing suitable to be hermetically sealed. Such tubular housings preferably have conical or frustro-conical ends forming hermetic closure of the tube.

An off-axis fiber or other signal launching element or component of optical devices disclosed here should be accurately aligned with the associated optical lens. In the assembly of such devices, alignment typically requires very precise mechanical translation stages and actuators, typically being operative to achieve sub-micron accuracy for good optical performance. The order in which the optical components are assembled can affect the types of alignment adjustments required. As a general rule, when an optical signal beam is expanded, e.g. exiting from the output side of a collimating lens, the alignment is sensitive to tilt and when the beam is not expanded, e.g., entering the input side of a collimating lens, it is sensitive to lateral offsets. For example, in a system including a fiber pigtail, an associated lens and an optical filter, if the lens is first attached to the optical filter and then the pigtail is attached to the lens, the alignment occurs at a point where the beam is not expanded and, therefore, will be sensitive to sub-micron offsets in the x-y plane (i.e., directions perpendicular to the optical path). Thus, precise x-y-z translation stages may be required for positioning the pigtail, lens, and optical filter. Alignment must be maintained during any subsequent joining operation, which typically involves soldering or adhesive bonding. Should the pigtail be first affixed to the lens, e.g., in forming a collimator, that subassembly may then be assembled and aligned to the optical filter. Because optical signals will be expanded when exiting the collimator, the alignment of the collimator with the optical filter is sensitive to tilt, typically being sensitive to tilt errors as small as 25µ radians.

Suitable methods and apparatus are commercially available and known to those skilled in the art for assembly, including alignment, of optical components in fiber optic devices. One such method uses a 3-axis linear positioning system coupled with a coarse mechanical tilt alignment provided by the fixturing used in the assembly process. U.S. Pat. No. 3,902,784 describes apparatus for forming an optical fiber connector, comprising a support extending in a generally vertical direction, a microscope, an optical fiber, and an optical fiber fixture. U.S. Pat. No. 6,168,319 describes a collimator alignment system having multiple fixtures for holding different optical components for alignment. The system includes a beam profiler for determining the beam size in at least one direction generally perpendicular to the optic axis of the fiber. U.S. Pat. No. 6,170,795 describes an optical device mounting apparatus comprising a sphere, a support in physical contact with the sphere such that the angular displacement of the sphere is possible with substantially no linear displacement thereof, and a clamp in physical contact with the outer surface of the sphere. Alternative methods and apparatus will be apparent to those skilled in the art for assembly of optical devices disclosed here. Each of the three U.S. patents mentioned above is incorporated herein by reference, in its entirety, for all purposes.

In accordance with another aspect of the invention, as disclosed above, improved apparatus and methods are provided for assembly of optical devices. Such apparatus and methods are suitable to provide rapid, precise and stable alignment of for the assembly of optical devices, preferred embodiments not requiring expensive nano-positioning systems and while avoiding optical component collisions. Alignment of the optical elements within a housing may be performed in any order, but preferably occurs such that two or more optical components are optically aligned simultaneously. That is, alignment is performed in such preferred embodiments by optically aligning, and directly optically coupling, at least two optical components to form a subassembly. Additional optical components are then optically aligned and, optionally, directly optically coupled to the subassembly, until all optical components are optically aligned and high signal throughput from the optical device is achieved. For example, alignment of a fiber pigtail and an optical lens element may first be performed, using the mating surfaces of the optical components and/or tip-tilting, for example, and subsequently additional optical components, such as an optical filter, can be optically aligned and directly optically coupled to the optical lens element. Additional optical components are optically aligned and directly optically coupled in a similar manner until all optical components of the optical device are optically aligned.

In certain configurations, the mating surfaces of two or more optical components facilitate rapid optical alignment such that little or nor tip-tilting, or other adjustment methods, are required for optical alignment of the optical components. One skilled in the art given the benefit of this disclosure will be able to assemble the optical devices disclosed here using the methods described here. In accordance with certain preferred embodiments of such assembly methods and apparatus, a precise 2-axis angular alignment method is employed in the assembly of certain embodiments of the optical devices disclosed here, or in the assembly of components for such devices, such as collimators and the like.

In certain configurations, a ball and socket arrangement is used to facilitate alignment of the optical components of the fiber optic device. That is, a first optical component of the device has a ball configuration and a second optical component has a corresponding socket configuration to lockingly receive the ball configuration of the first component. For example, an optical lens with a substantially spherical face may serve as a male bearing surface in a ball and socket arrangement with a second optical component of the device configured as the socket to receive the ball surface of the lens. A rapid and accurate alignment can be achieved that is adequately stable during subsequent production operations, e.g., soldering or adhesively bond the optical components in place, without significant loss of optical coupling efficiency. In certain especially preferred embodiments, the radius of curvature of the lens and that of a second optical element that it engages, e.g., the ferrule sleeves of the device of FIG. 6, have a common centerpoint. Exemplary of such embodiments are optical devices wherein a spherical lens is used. When a second optical component is mated to the spherical lens and is rotated about the center of the spherical lens, or a spherical surface of a lens derived from a sphere, e.g., a drum lens, the optic axis of the lens follows the rotation, thus eliminating the need to precisely orient the tilt of the lens during assembly and facilitating the alignment process.

In accordance with certain preferred embodiments of the optical devices disclosed here, optical components of the device comprise optical components with surfaces configured to mate with each other to facilitate rapid assembly of the fiber optic device. Specifically, the optical components have engaging mating surfaces, that is, surfaces whose three-dimensional geometries are correspondingly configured or contoured to fit into each other or otherwise to lockingly engage each other. Such engagement surfaces allow for rapid coupling of the optical components, preferably by mere placement of the engagement surfaces of at least two of the optical components together. Most preferably, such optical devises employ optical components whose engagement surfaces ensure proper optical alignment. That is, when the engagement surfaces are joined, proper alignment of those optical components of the fiber optic device is necessarily or automatically achieved. Such optical components having engagement surfaces that fit into one another are referred to in some instances below as "pluggable" optical components. Preferably the mating surfaces are designed such that joining of two of the optical components forms a ball-and-socket joint, a pivot joint, a planar joint, a saddle joint, or the like. To facilitate proper alignment, alignment spacers may be placed between the optical components. As used here and in the claims, an alignment spacer is any mechanical component, such as washers, transparent wafers, nuts, fittings and the like, that may be placed between the optical components to assist in the alignment, spacing, orientation or positioning of the optical components. Preferably, the alignment spacers have no adverse optical effects, e.g. no decrease in the optical performance characteristics of the fiber optic device, and are positioned out of the optical path. One skilled in the art, given the benefit of this disclosure, will be able to select alignment spacers suitable for mating two or more optical components of the fiber optic device.

In accordance with certain preferred embodiments, an optical system may be assembled using numerous methods. For example, in certain preferred embodiments, the optical components of the fiber optical package are positioned using an alignment apparatus, typically comprising adjustment clamps, such as a ball clamp and/or fiber pigtail clamp, for positioning the optical components. Optical elements, such as one or more filters, can be first positioned within a housing component, such as a photonic tube or the like, held by a suitable clamp. Optical lens elements can then be mounted into the housing so as to be directly optically coupled to the optical filter element. Optical testing can be performed to ensure that lens elements and filters are properly aligned. Optionally, a socket is provided, e.g., by a housing component, for receiving the optical lens element(s). Preferably a spherical socket receives (with direct contact) a spherical surface of the lens. Such mating surfaces allow rapid alignment of the optical lens element and the filter element previously positioned in the housing. The optical lens element may be fixed into position using an adhesive and the like, e.g. by injecting an adhesive into the joint area using a syringe or other suitable device. A fiber pigtail can then be assembled into position and aligned with the directly optically coupled optical lens element and optical element. A fiber pigtail clamp can be used with a fiber pigtail alignment tube adapted to temporarily hold the fiber pigtail during alignment. Typically a ball clamp is suitable for such alignment, e.g. tip-tilt alignment, of the fiber pigtail with the optical lens element. Optical testing can be performed to ensure proper alignment of the fiber pigtail with the optical lens element. Optionally, the fiber pigtail alignment tube can have mating surfaces for receiving the fiber pigtail and the optical lens element. Once aligned, the fiber pigtail may be fixed into position using an adhesive. Additional components can be assembled in like manner. Thus, a second lens can be directly optically coupled with the optical filter element, e.g., at the opposite side of a device in accordance with the axial design of FIG. 6, followed by optical testing to ensure proper alignment and fixing in position. A second fiber pigtail or optical fiber can be assembled into place, tested to ensure proper alignment, and fixed into position using an adhesive or the like. One skilled in the art given the benefit of this disclosure will be able to design and use other suitable apparatus for assembling and aligning components of fiber optic devices disclosed here.

As mentioned above, optical alignment of the components of the fiber optic devices may be fine-tuned using tip-tilt methods prior to fixing the position of optical components within a housing. For example, tip-tilt methods can be used, that adjust the optical components in x- and y-directions perpendicular to the optical path (z-direction). Preferably, a thin film filter element is first fixed in position and the positions of the optical lens element and/or launching component are adjusted to achieve optimum optical performance characteristics. In certain configurations, the optical lens element is first directly optically coupled with the launching component, e.g. to form a collimator, prior to alignment with a filter the optical element. That is, the launching device and optical lens element are directly optically coupled to form a collimator prior to positioning with the optical element. In other configurations, the optical lens element and the optical element are first aligned and directly optically coupled and the launching component is then aligned with the optical lens element. Suitable mechanical devices (as discussed elsewhere herein) may be used to align the optical components of the fiber optic device. After alignment of the optical components, the optical components are fixed into position using one or more adhesives, such as epoxies or the like. Suitable adhesives include, for example, Epotek 353 ™ produced by Epoxy Technology, Inc., Billerica, Mass., USA, or other suitable adhesive, such as are commercially available and known to those skilled in the art.

Assembly apparatus in accordance with the foregoing disclosure is operative to assemble optical devices disclosed above, such as devices in accordance with FIG. 6. An optics sub-assembly is pre-assembled, comprising a filter element held between drum lenses in a centerpiece. The optics sub-assembly is held in a heated clamp as a fiber pigtail is aligned to it. The fiber pigtail comprises a fiber in a ferrule fixed in a ferrule sleeve that provides a generally spherical mating surface seen to be seated against a correspondingly configured end surface of the second drum lens. The ferrule almost contacts the surface of such drum lens. The fiber pigtail is to be temporarily held during alignment by a fiber pigtail alignment tube that, in turn, is acted upon by a fiber pigtail clamping fixture comprising an X-Y translatable spring member fitted with a ball contact. The ball contact has free sliding contact with the open tubular end surface of fiber pigtail alignment tube. The spring member applies Z-direction pressure during assembly and alignment. Thus, X-Y adjustment of the spring member causes corresponding alignment movement of the contacting surface of the pigtail and drum lens. After aligning and fixing the position of the first pigtail, the process can be repeated to assemble a second pigtail to the fixed drum lens on the opposite side. As noted above, the optics sub-assembly optionally is installed into a photonics tube or other housing prior to being assembled to the fiber pigtails.

In accordance with certain preferred embodiments, optic devices are provided having good optical performance characteristics as well as being designed such that the optical components of the device can be assembled in a rapid, accurate and reproducible manner. In preferred embodiments, such reproducibility is achieved through the use of mating surfaces. For example, in the embodiment illustrated schematically in FIG. 1*a*, a surface of a first optical component 2 may have a substantially spherical shape, e.g. a ball, and the surface of a second optical component 3 may have a substantially concave shape, e.g. a socket. Connection of the ball-and-socket joint results in proper optical alignment of optical components 2 and 3. One skilled in the art given the benefit of this disclosure will recognize that numerous other male and female connector configurations or geometries are suitable for properly aligning the optical components of the fiber optic device. Referring to FIG. 1*b*, male and female connectors 4 and 5, each having a saddle-like geometry, may be used to properly align the optical components. Referring to FIG. 1*c*, a generally cylindrically shaped male connector 6 and a concave shaped female connector 7 may be used to properly align the optical components. Referring to FIG. 1*d*, a condyloid joint may be created by using the male connector 8 and the female connector 9. In certain embodiments, epoxy or adhesive is placed between the connectors to permanently fix the optical components after connection of the mating surfaces of the optical components. Preferably, the epoxy or adhesive is optically transparent. In other embodiments, the mating surfaces of the optical components are connected and 2-axis tip-tilting (discussed below) is used to optimize the optical performance. Subsequent to performance optimization, epoxy or adhesive may be injected into the package to permanently fix the optical components. In other embodiments, adhesive is coated onto the mating surfaces, and after 2-axis tip-tilting to align the optical components, heat is applied to cure the adhesive and fix the optical components. One skilled in the art given the benefit of this disclosure, will be able to select suitable adhesives for fixing the optical components into positions. Exemplary adhesives include but are not limited to those mentioned above, such as, for example, Epotek 353™ produced by Epoxy Technology, Inc.

The optical lens element can be selected from commercially available optical lenses including GRIN lenses, ball lenses, drum lenses, and the like, manufactured by Nippon Sheet Glass, Edmund Scientific, etc. The optical lens element may be ground from a larger optical lens element, such that the lens has a suitable size and geometry for incorporation into the fiber optic device. Referring to FIG. 2, optical lens element 12 is seen to have an optic axis whose origin lies at the center of the optical lens element 12. The z-direction of the optic axis is the direction of the optical path. The x and y directions are perpendicular to the optical path. Thus alignment of the optical lens element typically occurs by adjustment of the lens position in the x-, y-, and z-directions. Preferably, the mating surfaces of the optical lens element, and any other alignment spacers that are used, are designed such that only 2-axis (x- and y-axis) alignment is required, e.g. the thickness of the alignment spacers provides for suitable separation in the z-direction between the optical lens element and the other optical components of the fiber optic device.

Figure 8:
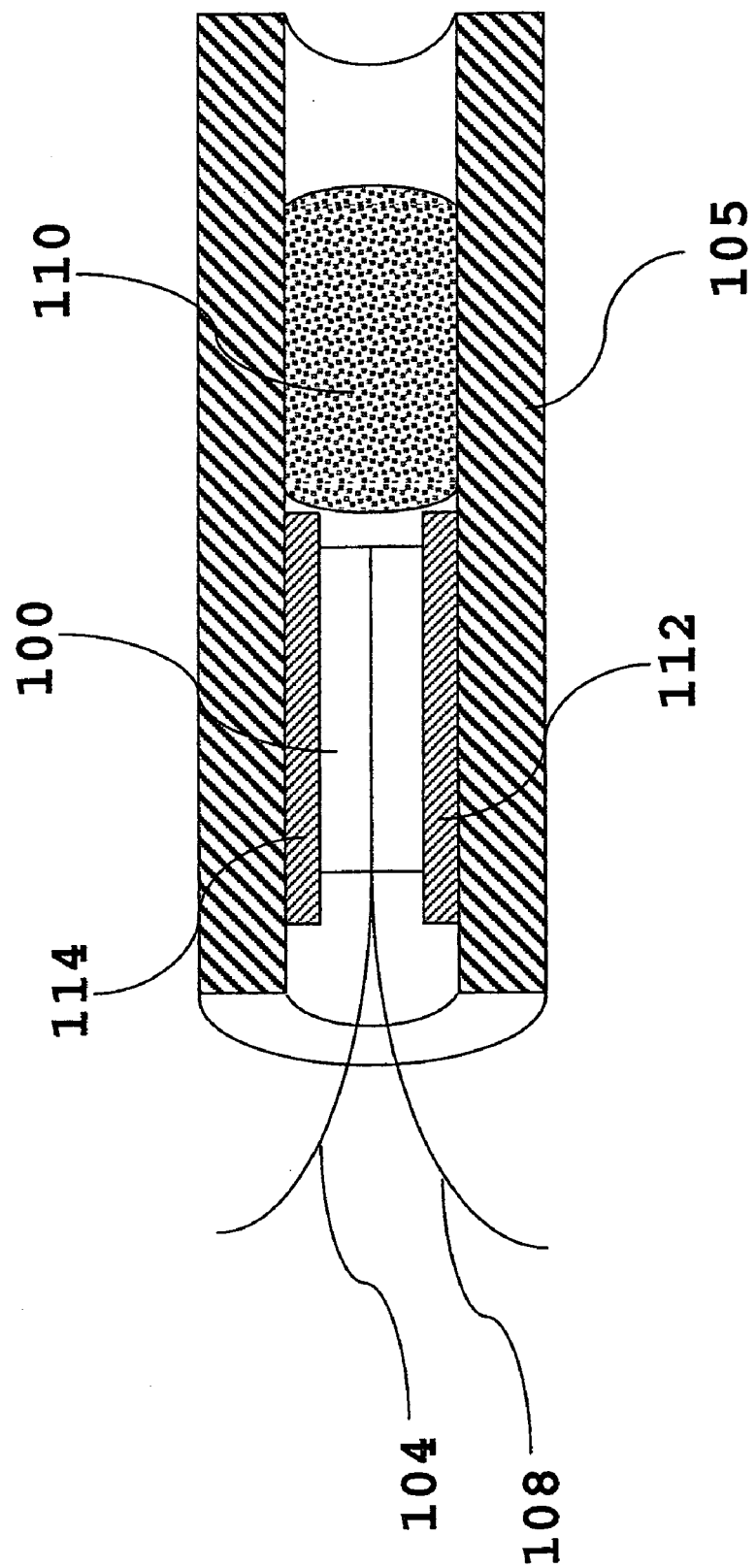
FIG. 8 is a schematic section view of an optical signal launching device directly optically coupled to an optical lens element in the housing of an optical device in accordance with certain preferred embodiments.

In accordance with certain preferred embodiments, a fiber pigtail may be optically coupled with an optical lens element, such as a GRIN lens, ball lens or drum lens, for example. Referring to FIG. 8, a fiber pigtail 100 comprises a first optical fiber 104 and a second optical fiber 108. The fiber pigtail is directly optically coupled with an optical lens element 110, such as a drum lens. In preferred embodiments, the optical lens element is positioned such that the signals launched by the first and second optical fibers of the fiber pigtail do not converge. One skilled in the art given the benefit of this disclosure will be able to select suitable distances for positioning optical lens elements. Typically the fiber pigtail 100 and the optical lens element 110 are positioned within a housing 105, such as a photonic tube. The housing may comprise one or more guides, such as fiber pigtail guides 112 and 114, for positioning of the optical components within the housing. The guides (discussed further below) typically fit around the optical components to position the optical components close to the longitudinal axis of the housing. One skilled in the art given the benefit of this disclosure will be able to select widths and lengths for the guides suitable for positioning the optical components in a housing.

Figure 9:
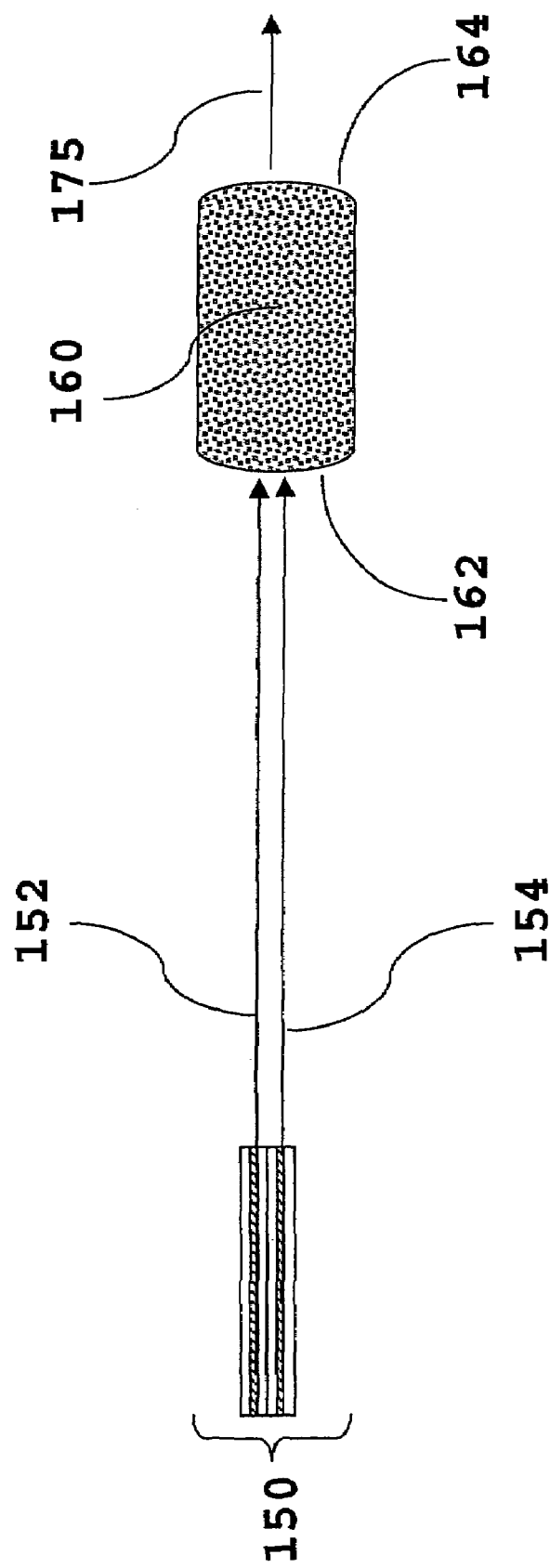
FIG. 9 is a schematic section view of a signal launching device comprising optical fiber ends directly optically coupled to an optical lens element, in accordance with certain preferred embodiments.
Figure 10:
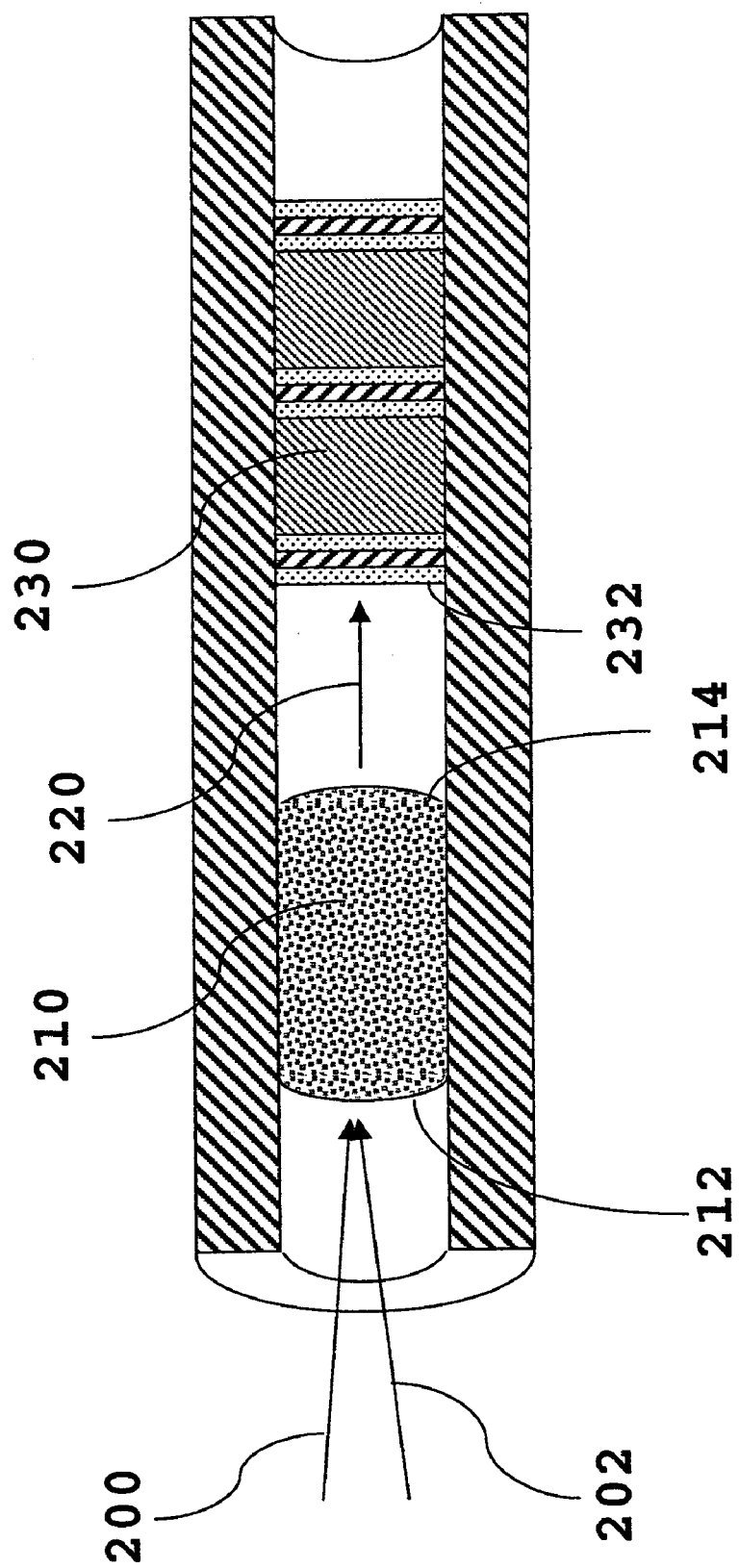
FIG. 10 is a schematic section view of a preferred embodiment, showing an optical lens element directly optically coupled with a second optical element of the device.
Figure 11:
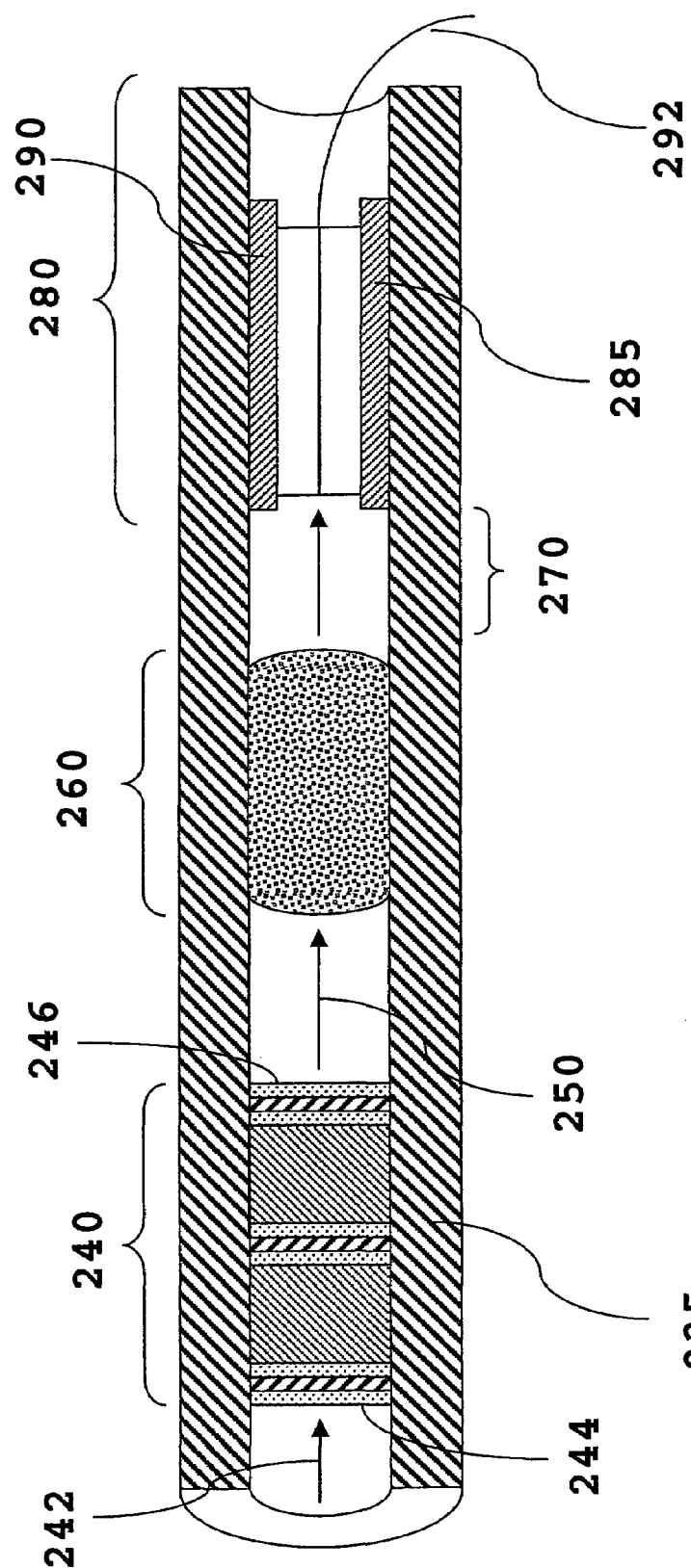
FIG. 11 is a schematic section view of a preferred embodiment, showing an optical lens element directly optical coupled with an optical lens element which is directly optically coupled with a receiving device, in accordance with certain preferred embodiments.

In accordance with certain preferred embodiments, the optical lens element acts to collimate optical signals. For example, a first input signal 152 and a second input signal 154 can be incident on a first surface 162 of an optical lens element 160 in FIG. 9. The optical lens element 160 typically is operative to focus the input signals along the same axis as the optic axis. Signals 175 exit a second surface 164 of optical lens element 160 at the low angle of incidence.

Thus suitable positioning of the optical lens element provides for low angles of incidence. That is, when the optical lens element is properly aligned with an optical element (discussed below), the angle of incidence of signals exiting the second surface 164 of the optical lens element 160 and incident on the surface of an optical element are preferably $\leq 1°$. One skilled in the art given the benefit of this disclosure will be able to select optical lens elements having suitable properties for focusing signals onto a surface of an optical element.

In accordance with certain preferred embodiments, the signals that exit a first optical lens elements may be incident on a surface of an optical element, such as a Fabry-Perot etalon or stacked, optically coupled etalons, for example. Because the signals are substantially parallel to the optic axis, suitable alignment of the optical element (discussed below) allows the signals to be incident on the surface of the optical element with an angle of incidence of $\leq 1°$. For example, first input signals 200 and second input signals 202 are incident on a first surface of an optical lens element 210. The optical lens element 210 collimates the signals and preferably aligns the signals substantially parallel to the optic axis. The aligned parallel signals 220 may be incident on the surface of an optical element 230, such as an interleaver. Therefore, through the use of the optical lens element, signals 200 and 202, which may have an angle of incidence of $>1°$ (on the first surface 212 of the optical lens element 210), are made substantially parallel to the optic axis such that the substantially parallel signals can be launched from the second surface 214 of the optical lens element 210 using an angle of incidence $\leq 1°$, onto a first surface 232 of an optical element 230. One skilled in the art given the benefit of this disclosure will be able to select, position, and align optical lens elements and optical element to achieve angles of incidence $\leq 1°$.

In accordance with certain preferred embodiments, the optical element acts to select one or more signals from the signals that are launched onto the surface of the optical element. That is, the optical element is operative to selectively filter signals such that certain signals or pass bands are passed by the optical element while other signals are reflected by the optical element. For example, signal 250 may be passed by an optical element 240. Because signals 242 are launched onto a first surface 244 of an optical element 240 using an angle of incidence $\leq 1°$, signals 250 that are passed exit the optical element 240 in a manner that is substantially orthogonal to the second surface 246 of the optical element 240, e.g. the exiting signals are approximately perpendicular to the second surface of the optical element and substantially parallel to the optic axis. To focus passed signals 250 into a fiber pigtail or other collection or receiving device, a second optical lens element 260 can be used. The second optical lens element 260 is typically positioned such that second optical lens element 260 is operative to focus the signals 250 that exit the second surface 246 of the optical element 240 into one single signal 270 that can enter into a fiber 280 for transmitting signal 270 to an appropriate destination. One skilled in the art given the benefit of this disclosure will be able to select optical lens element for focusing passed signals into one or more receiving devices.

In accordance with certain preferred embodiments, such low angles of incidence can be achieved by aligning the optical components of the optical fiber package in innumerable sequences, e.g. the assembly order of the fiber optic device may be variable. That is, alignment of the various optical components of the fiber optic device may take place in numerous different orders. For example, in certain embodiments a launching device and a first optical lens element are first aligned and directly optically coupled and fixed into position within a housing, for example. The aligned first optical lens element and launching device are then aligned and directly optically coupled with an optical element. In other embodiments, a first optical lens element is first aligned and directly optically coupled with the optical element, and the aligned first optical lens element and optical element are then aligned and directly optically coupled with a launching device. In systems incorporating a plurality of optical components, e.g. two or more launching devices, two or more optical elements, two or more optical lens elements, and combinations thereof, alignment of the optical components may also be performed in numerous sequences. One skilled in the art given the benefit of this disclosure will be able to select suitable alignment and coupling sequences for assembling the fiber optic device described here.

Figure 12:
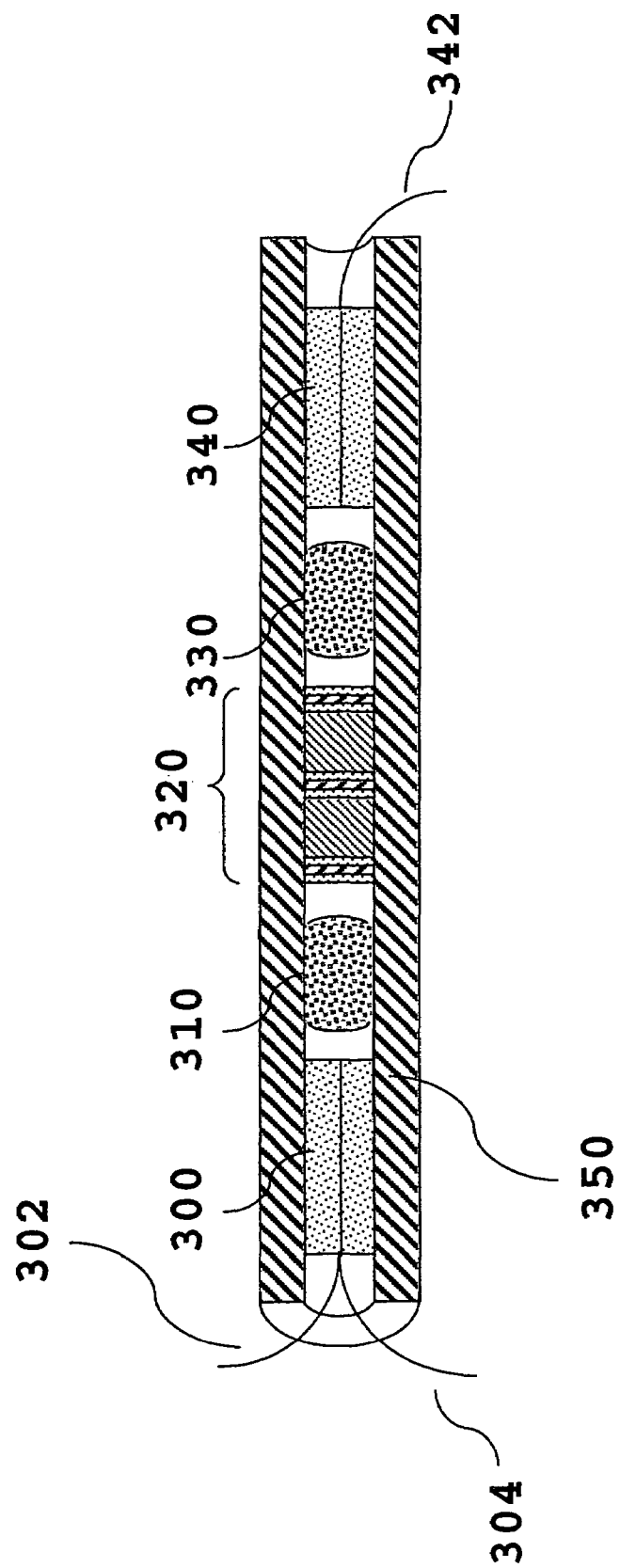
FIG. 12 is a schematic section view of another preferred embodiment.

A fiber optic device in accordance with certain preferred embodiments operative for selecting signals, e.g., for selectively passing one or more channels from a multi-channel multiplexed optical signal is shown in FIG. 12. The optical system comprises a first fiber pigtail 300, a first optical lens element 310, an optical element 320, a second optical lens element 330, and an optical fiber 340 all packaged within housing 350. The first and second optical lens elements may each comprise a drum lens, GRIN lens, ball lens, etc. The optical element may comprise an etalon, an interleaver, stacked and optically coupled etalons, etc. As discussed above, the fiber optic device typically acts to select and pass one or more signals or pass bands from signals that are launched by fiber pigtail 300. Signals launched by fiber pigtail 300 are collimated using first optical lens element 310. The collimated signals are then incident onto the surface of optical element 320. Optical element 320 passes certain pass bands that are incident on second optical lens element 330. Second optical lens element 330 collimates the pass bands which are received by optical fiber 340 and are transmitted to an appropriate destination. One skilled in the art given the benefit of this disclosure will be able to design fiber optic devices suitable for an intended use.

Figure 14:
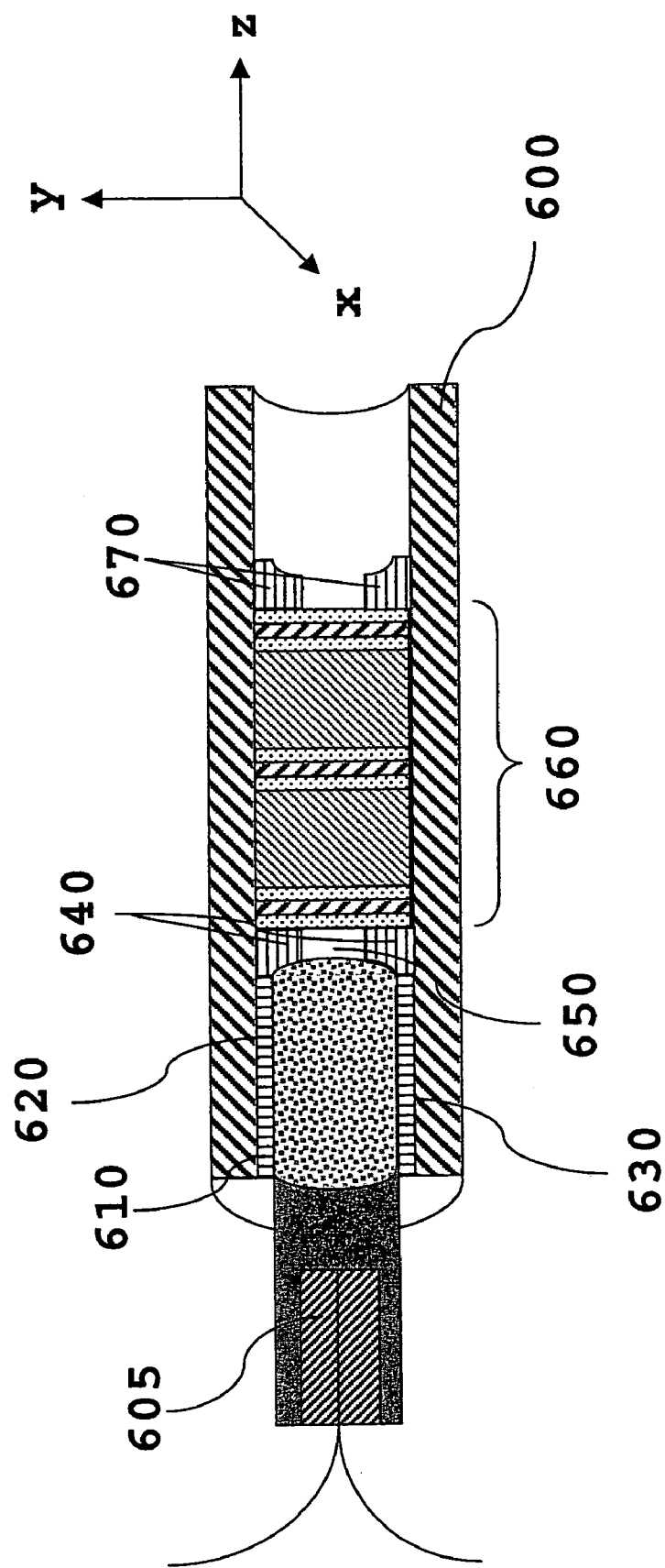

FIG. 13a shows an optical element 510 in accordance with certain preferred embodiments. The optical element 510 may be inserted into a housing 500, such as an AC Photonics tube. In certain embodiments, the optical element 510 is disposed between two lens seats 515 and 520 (see FIG. 13b). Lens seats 515 and 520 are operative to position the optical lens element in housing 500 a suitable distance from the surfaces of the optical element 510. That is, the dimensions of the lens seats are such that the surfaces of the optical lens elements are positioned a suitable distance from the surfaces of the optical element. For example, a collimator comprising a fiber pigtail 605 and an optical lens element 610 can be positioned in a housing 600 that comprises an optical element 660 disposed between two lens seats 640 and 670 that provide for a cavity 650 separating the surface of the lens element 610 and the optical element 660 (see FIG. 14). The collimator can be disposed between two collimator guides 620 and 630 such that the angle of incidence of signals launched from the collimator onto the surface of the optical element 660 is preferably less than 1o. Preferably, the collimator guides and the lens seats are manufactured to provide for minimal movement of the collimator. That is, the dimensions of the collimator guides and the lens seats allow positioning of the collimator such that signals launched from the collimator have an angle of incidence<1o even in the presence of disturbances, such as vibrations. In certain embodiments, washers or gaskets, e.g. rubber washer or gaskets, are positioned between the collimator and lens seats to reduce the stresses that might occur from the glass surfaces being in direct contact with metal surfaces. In preferred embodiments, the collimator is bonded to the collimator guides using an adhesive or other suitable materials for fixing the collimator to the collimator guides and/or lens seats. One skilled in the art given the benefit of this disclosure will be able to design suitable guides and seats for receiving the optical components of the fiber optic device disclosed here. The lens seats may comprise numerous shapes and geometries (see triangular lens seats 680 in FIG. 3a and hexagonal lens seats 690 in FIG. 3b) and preferably are of a suitable geometry for receiving the optical lens element.

In accordance with other embodiments, the collimator guides and the lens seats are operative to provide for adjustment of the collimator. That is, the collimator may be tipped or moved to provide for a suitable angle of incidence for launching signals from the collimator and onto the surface of the optical element. Typically, the dimensions of the collimator guides are adjusted to provide for translation of the collimator. For example, the dimensions of the collimator guides may be reduced to provide for x-y movement (e.g. perpendicular to the optical path) of the collimator. The lens seats are typically manufactured such that movement in the z-direction (e.g. the direction of the optical path) is not required. Thus the collimator may be tipped or tilted in the x or y directions to allow for a suitable angle of incidence. One skilled in the art given the benefit of this disclosure will be able to select suitable tip or tilt angles for aligning a collimator within the fiber optic device described here. After alignment of the collimator within the system, the collimator may be bonded to the housing 600 to prevent unwanted movement of the collimator.

Although the present invention has been described above in terms of specific embodiments, it is anticipated that other uses, alterations and modifications thereof will become apparent to those skilled in the art given the benefit of this disclosure. It is intended that the following claims be read as covering such alterations and modifications as fall within the true spirit and scope of the invention.

It should be understood that the articles "a" and "an", as used in this discussion and in the claims, in keeping with traditional patent usage, are intended to mean "at least one" or "one or more." They include, therefore, both the singular and plural forms of the nouns that the articles modify, and this is the case even though in some instances the alternative expressions "at least one" or "one or more" or the like are used.

We claim:

1. A fiber optic device comprising, in combination:
   an optical lens element having a focal length;
   an optical fiber mounted at the focal plane of the optical lens element; and
   a selectively transparent interference filter operative to communicate optical signals with the optical fiber through the optical lens element, the optical lens element and the interference filter cooperatively defining an optic axis substantially normal to the plane of the interference filter; wherein the optical fiber is positioned off-axis and the angle of incidents of an expanded beam signal between the off-axis optical fiber and the lens is not greater than 1.5 degrees.

2. The fiber optic device of claim 1 wherein the selectively transparent interference filter has a spectral response suitable for 50 GHz channel spacing.

3. The fiber optic device of claim 1 wherein the optical fiber is positioned off-axis and the spectral response of the selectively transparent interference filter has pass bands centered on the ITU Grid.

4. The fiber optic device of claim 1 wherein the selectively transparent interference filter has a spectral response suitable for 25 GHz channel spacing.

5. The fiber optic device of claim 3 wherein the selectively transparent interference filter has channels centered on the ITU Grid.

6. The fiber optic device of claim 1 wherein the selectively transparent interference filter has a spectral response suitable for channel spacing not greater than 12.5 GHz.

7. The fiber optic device of claim 5 wherein the selectively transparent interference filter has channels centered on the ITU Grid.

8. The fiber optic device of claim 1 wherein the selectively transparent interference filter comprises at least five coherently coupled cavities.

9. The fiber optic device of claim of claim 1 further comprising a housing, the optical lens element being secured within the housing and the optical fiber being mounted in an optical fiber ferrule secured within the housing.

10. The fiber optic device of claim 9 wherein the housing is substantially tubular.

11. The fiber optic device of claim 1 wherein the angle of incidence of an expanded beam signal between the off-axis optical fiber and the lens is not greater than 1.2 degrees.

12. The fiber optic device of claim 1 wherein the angle of incidence of an expanded beam signal between the off-axis optical fiber and the lens is not greater than 1 degree.

13. The fiber optic device of claim 1 wherein the optical lens element has a focal length of at least 3 mm.

14. The fiber optic device of claim 1 wherein the optical lens element has a focal length of at least 4 mm.

15. The fiber optic device of claim 1 further comprising an optical fiber ferrule, wherein the off-axis optical fiber is one of multiple off-axis optical fibers mounted together in a ferrule at the focal plane of the optical lens element.

16. The fiber optic device of claim 15 wherein at,least two off-axis optical fibers are mounted in contact with each other.

17. The fiber optic device of claim 15 wherein at least two off-axis optical fibers are mounted in the ferrule less than 10 micron spacing from each other.

18. The fiber optic device of claim 15 wherein at least two off-axis optical fibers are mounted in the ferrule with less than 100 micron spacing from each other.

19. The fiber optic device of claim 15 wherein the off-axis optical fibers mounted together in the ferrule each has reduced cladding in an area of contact with the other.

20. The fiber optic device of claim 19 wherein the off-axis optical fibers mounted together in the ferrule have core-to-core spacing of less than 125 um.

21. The fiber optic device of claim 1 wherein:
the selectively transparent interference filter is a high Q filter having a spectral response suitable for 50 GHz channel spacing on the ITU Grid;
the optical lens element has a focal length of at least 3 mm;
the angle of incidence of an optical signal passed between the off-axis optical fiber and the lens is not greater than 1.2 degrees; and
the optical fiber is operative as a single mode fiber for 1550 nm optical signals.

22. The fiber optic device of claim 1 wherein the first optical lens element comprises an aspheric lens.

23. The fiber optic device of claim 21 wherein the aspheric lens is a drum lens.

24. The fiber optic device of claim 1 wherein the optical lens element comprises a spherical lens.

25. The fiber optic device of claim 1 wherein the focal length of the optical lens element is between 2 mm and 8 mm.

26. The fiber optic device of claim 1 wherein the focal length of the optical lens element is between about 3.5 mm and 4.5 mm.

27. A fiber optic device comprising, in combination:
an optical lens element and having a focal length greater than 2 mm:
an optical signal element having an optical surface at the focal plane of the optical lens element: and
a selectively transparent interference filter operative to communicate optical signals with the optical surface of the optical signal element through the optical lens element, the optical lens element and the optical signal element cooperatively defining an optic axis substantially normal to the plane of the interference filter wherein the optical surface of the optical signal element is positioned off-axis.

28. An optical multiplexing device comprising:
a first optical lens element;
a first optical fiber ferrule comprising at least first and second optical fibers mounted together in the ferrule at the focal plane of the first optical lens element;
a selectively transparent interference filter;
a second optical fiber ferrule comprising at least a third optical fiber mounted in the second ferrule; and
a second optical lens element;
wherein:
the interference filter has a spectral response suitable for channel spacing not greater than 50 GHz and is operative
to receive optical signals passed to the interference filter from the first optical fiber through the first optical lens element,
to reflect at least selected optical signals back through the first optical lens element to the second optical fiber, and
to pass at least selected optical signals to the third optical fiber through the second optical lens element,
each of the optical lens elements has a focal length greater than 3 mm,
the angle of incidence of optical signals passed between the optical fibers and the lens elements is not greater than 1.2 degrees, and
each of the optical fibers is operative as a single mode fiber for 1550 nm optical signals.

29. A fiber optic device comprising:
a housing;
a first optical lens element positioned within the housing and having a focal length greater than 2 mm;
a first optical signal element having an optical surface in the housing at the focal plane of the first optical lens element;
a selectively transparent interference filter positioned within the housing and operative to communicate optical signals with the first optical signal element through the first optical lens element, the first optical lens element and the interference filter cooperatively defining an optic axis substantially normal to the plane of the interference filter;

a second optical lens element mounted within the housing and having a focal length greater than 2 mm; and a second optical signal element having an optical surface in the housing at the focal plane of the second optical lens element and operative to receive optical signals passed by the interference filter.

30. The fiber optic device of claim 29 wherein the first optical signal element comprises an optical fiber.

31. The fiber optic device of claim 29 wherein the first optical signal element comprises an optical detector.

32. The fiber optic device of claim 29 wherein the first optical signal element comprises an optical signal waveguide.

33. The fiber optic device of claim 29 wherein the first optical signal element comprises a light source operative to emit optical signals at the optical surface.

34. The fiber optic device of claim 33 wherein the light source comprises a laser.

35. The fiber optic device of claim 33 wherein the light source comprises a semiconductor optical amplifier.

36. The fiber optic device of claim 33 wherein the light source comprises an edge emitting light emitting diode.

37. The fiber optic device of claim 29 wherein the selectively transparent interference filter comprises a sputter-deposited film stack comprising alternating layers of a first material and a second material, the first material having a different refractive index than the second material.

* * * * *